United States Patent
Yamada et al.

(10) Patent No.: US 7,551,839 B2
(45) Date of Patent: Jun. 23, 2009

(54) METHOD OF GENERATING VIDEO REPRODUCTION SYNCHRONIZING SIGNAL, PROGRAM FOR GENERATING VIDEO REPRODUCTION SYNCHRONIZING SIGNAL, TIMING CONTROL APPARATUS, METHOD OF SYNCHRONOUSLY REPRODUCING VIDEO AND AUDIO, PROGRAM FOR SYNCHRONOUSLY REPRODUCING VIDEO AND AUDIO, AND APPARATUS FOR SYNCHRONOUSLY REPRODUCING VIDEO AND AUDIO

(75) Inventors: Norihiko Yamada, Okaya (JP); Mitsuhiro Inazumi, Shiojiri (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 750 days.

(21) Appl. No.: 11/178,486

(22) Filed: Jul. 12, 2005

(65) Prior Publication Data

US 2006/0012709 A1    Jan. 19, 2006

(30) Foreign Application Priority Data

Jul. 14, 2004    (JP)    ............................. 2004-207180
Jul. 14, 2004    (JP)    ............................. 2004-207188

(51) Int. Cl.
H04N 7/00    (2006.01)
(52) U.S. Cl. ............................. 386/96; 386/46; 348/515
(58) Field of Classification Search ................... 386/96; 348/515
See application file for complete search history.

(56) References Cited

FOREIGN PATENT DOCUMENTS

| JP | 05-137103 | 6/1993 |
|---|---|---|
| JP | 06-343165 | 12/1994 |
| JP | 11-134804 | 5/1999 |
| JP | 11134804 A | * 5/1999 |
| JP | 2001-169249 | 6/2001 |
| JP | A-2003-339023 | 11/2003 |

OTHER PUBLICATIONS

International Search Report for PCT/JP2005/013207, mailed October 25, 2005 (w/English-language Translation).

* cited by examiner

Primary Examiner—Thai Tran
Assistant Examiner—Girumsew Wendmagegn
(74) Attorney, Agent, or Firm—Oliff & Berridge PLC

(57) ABSTRACT

Exemplary embodiments include a method of generating a video reproduction synchronizing signal to generate a video reproduction synchronizing signal to reproduce video data and audio data in synchronization with each other. The method includes acquiring output processing end timing for output to an audio reproducing unit for one-frame equivalent audio data that is equivalent to a display period for one frame of video data; and generating the video reproduction synchronizing signal every time the output processing end timing is acquired. According to the method of generating a video reproduction synchronizing signal of the invention, since a video reproduction synchronizing signal is generated from audio data, it is possible to perform frame update for video data on the basis of only resources of a timer for audio reproduction. This makes highly accurate lip-sync possible and makes management of timer resources easy.

8 Claims, 17 Drawing Sheets

(EXAMPLE) VIDEO DATA: 29.97 [frame/sec], AUDIO DATA: 44.1 [KHz]
Ni = 44100 [sample/sec] / 29.97 [frame/sec] = 1471.471471 ... [sample]

| FRAME NUMBER $n$ | NUMBER OF OUTPUT SAMPLES OF AUDIO DATA N [sample] | $b_n$ (INITIAL VALUE $b_0=0$) | $[b_n]$ | INCREMENT OF $[b_n]$ $[b_n]-[b_{n-1}]$ (THIS IS USED AS REMINDER) |
|---|---|---|---|---|
| 1 | 1471 | 0.471471... | 0 | 0 |
| 2 | 1471 | 0.942942... | 0 | 0 |
| 3 | 1471 | 1.414414... | 1 | 1 |
| 4 | 1472 | 1.885885... | 1 | 0 |
| 5 | 1471 | 2.357357... | 2 | 1 |
| 6 | 1472 | 2.828828... | 2 | 0 |
| 7 | 1471 | 3.300300... | 3 | 1 |
| 8 | 1472 | 3.771771... | 3 | 0 |
| 9 | 1471 | 4.243243... | 4 | 1 |
| 10 | 1472 | 4.714714... | 4 | 0 |
| 11 | 1471 | 5.186186... | 5 | 1 |

FIG. 12

| SAMPLING FREQUENCY OF AUDIO DATA [KHz] \ FRAME RATE OF VIDEO DATA [fps] | 10 | 15 | 18 | 24 | 29.97 | 30 |
|---|---|---|---|---|---|---|
| 8 | REFER TO RULE "10-8" | REFER TO RULE "15-8" | ...... | ...... | ...... | ...... |
| 24 | ...... | ...... | ...... | ...... | ...... | ...... |
| 32 | ...... | ...... | ...... | ...... | ...... | ...... |
| 44.1 | ...... | ...... | ...... | ...... | REFER TO RULE "29.97-44.1" | ...... |
| 48 | ...... | ...... | ...... | ...... | ...... | REFER TO RULE "30-48" |

FIG. 13

METHOD OF GENERATING VIDEO REPRODUCTION SYNCHRONIZING SIGNAL, PROGRAM FOR GENERATING VIDEO REPRODUCTION SYNCHRONIZING SIGNAL, TIMING CONTROL APPARATUS, METHOD OF SYNCHRONOUSLY REPRODUCING VIDEO AND AUDIO, PROGRAM FOR SYNCHRONOUSLY REPRODUCING VIDEO AND AUDIO, AND APPARATUS FOR SYNCHRONOUSLY REPRODUCING VIDEO AND AUDIO

This application claims the benefit of Japanese Patent Applications No. 2004-207180 filed Jul. 14, 2004 and No. 2004-207188 filed Jul. 14, 2004. The entire disclosure of the prior applications is hereby incorporated by reference herein in its entirety.

BACKGROUND

The exemplary embodiments relate to a method of generating a video reproduction synchronizing signal, a program for generating a video reproduction synchronizing signal, a timing control apparatus, a method of synchronously reproducing a video and an audio, a program for synchronously reproducing a video and an audio, and an apparatus for synchronously reproducing a video and an audio.

When reproduction of a video and an audio are performed, if the video and the audio are not extremely accurately reproduced in synchronization with each other, a viewer may experience deviation of the synchronization as a sense of incongruity. Extremely accurately synchronizing a video and an audio so as not to give such a sense of incongruity or a technique therefore, is called "lip-sync" or "lip-synchronization", "AV (Audio-Video) synchronization", and the like.

Since frequencies of clocks used for reproduction of a video and an audio are different, in an ordinary video audio reproduction apparatus, it is necessary to prepare different timers for the video and the audio, and manage resources for the prepared timers, respectively. In the case of such a constitution, there is a problem in that, if there are errors in the respective timers for video reproduction and audio reproduction, errors of reproduction timing for the video and the audio accumulate to make it impossible to maintain the lip-sync.

Thus, as a technique for coping with this problem, there has been proposed a technique for counting the number of output samples of audio data with a counter for audio data output and correcting a timer for video reproduction on the basis of a value of this counting (e.g., see JP-A-2003-339023). According to the technique described in JP-A-2003-339023, since the timer for video reproduction is corrected on the basis of a timer for audio reproduction, it is possible to control the accumulation of errors of reproduction timing for a video and an audio.

SUMMARY

However, in the technique described in JP-A-2003-339023, there is a problem in that it is necessary to prepare resources for the respective timers for video reproduction and audio reproduction, and managing the resources.

In addition, when the technique disclosed in JP-A-2003-339023 is applied to synchronous reproduction of a video and an audio on a non-preemptive multitask operating system (operating system will be hereinafter referred to as OS) with low real-time performance, there is a problem in that the synchronous reproduction of a video and an audio is restricted by a task scheduling period of the multitask OS, and a video reproduction synchronizing signal cannot be outputted at a desired timing.

Note that the "multitask OS with low real-time performance" in this context refers to, for example, a multitask OS for which, when some interrupt occurs, certainty of an instantaneous response to the interrupt is not guaranteed. That is, "multitask OS with low real-time performance" refers to a multitask OS that cannot perform hard real-time processing. The "non-preemptive multitask OS" in this context refers to a multitask OS for which, when processing of one task (also referred to as a process) is performed on a CPU, even if another task with a higher priority than the one task occurs, a response time until the one task is switched to another task is not guaranteed.

Task scheduling of the non-preemptive multitask OS with low real-time performance (in the following description, simply referred to as non-preemptive multitask OS) will be hereinafter explained.

FIG. 17 is a schematic to explain the task scheduling of the non-preemptive multitask OS. To simplify the explanation, it is assumed that the number of CPUs in a system is one and an SMT (Simultaneous Multi Thread) technique is not used in the CPU. In FIG. 17, reference sign Tt denotes a task scheduling period of the non-preemptive multitask OS (a timer interrupt period by the OS). This task scheduling period Tt makes it possible to switch plural tasks. In addition, reference sign Ti denotes a desired period. For example, it is assumed that the period Ti is a period at which a video synchronous reproduction signal for performing frame update for video data should be outputted.

Since the OS is multitask, it is assumed that there are plural tasks A, A', B, and C that should be processed and the task A' is a task for performing frame update for a video. In addition, as shown in (a) in FIG. 17, it is assumed that the task A is set such that the task A' is processed after Ti.

As it is seen from FIG. 17, the tasks A, A', B, and C perform operations, respectively, while being switched at task scheduling periods Tt. In this case, it is ideal that the task A' is processed after Ti from start of processing for the task A and, after that, the task A' is processed at every period Ti. Therefore, as shown in (b) in FIG. 17, processing for the task A' should be started at timing t1 after Ti from the start of processing for the task A.

However, in this case, as shown in (c) in FIG. 17, since the task C is being processed at the timing t1, it is impossible to give CPU time to the other tasks and process the task A'.

At timing t1' when the task C ends, as shown in (d) in FIG. 17, CPU time is allocated to make it possible to process the task A'. Therefore, at this point, an error of time Δt occurs with respect to the timing t1 at which it is desired to process the task A'.

As shown in (e) in FIG. 17, the task A' is set to be processed after Ti again. Thus, as shown in (f) in FIG. 17, the task A' is set to be processed at timing t2'.

However, at timing t2', since the task C is being processed, it is impossible to give CPU time to other tasks and process the task A'. Thereafter, at timing t2" after the processing for the task C ends, as shown in (g) in FIG. 17, CPU time is allocated to make it possible to process the task A'. Therefore, at this point, errors are further accumulated to be Δt', with respect to timing t2, at which it is desired to process the task A'.

In this way, in order to process frame update for video data at accurate timing, it is necessary to make it possible to acquire more precise timing than a task scheduling period of the OS. However, in the non-preemptive multitask OS, the respective tasks can be switched only at the task scheduling period Tt.

In such a multitask OS, as a method of making it possible to acquire more precise timing than the task scheduling period, it is conceivable to perform some processing in a kernel space of the multitask OS to thereby acquire timing at a more precise timing than the task scheduling period.

However, when it is attempted to realize this method, in the case of a general multi-user OS, it is necessary to give a privilege mode (e.g., in a UNIX (registered trademark) OS, root). Since the privilege mode should not be given easily in terms of security, there is a problem in that it is difficult for general users to use the privilege mode freely.

As in the exemplary embodiment, when it is necessary to synchronize a video and an audio, it is not sufficient that a precise task scheduling period is simply obtained. Even if a period equivalent to a frame rate of vide data is obtained by performing some processing in the kernel space, it is further necessary to add processing for synchronizing a video and an audio. Thus, complicated time management is necessary, making implementation difficult.

Therefore, the exemplary embodiments provide a method of generating a video reproduction synchronizing signal, a program to generate a video reproduction synchronizing signal, and a timing control apparatus that are capable of performing extremely accurate lip-sync and perform management of timer resources easily.

The exemplary embodiments also provide a method of generating a video reproduction synchronizing signal, a program to generate a video reproduction synchronizing signal, and a timing control apparatus that are capable of generating, when synchronous reproduction of a video and an audio is performed using a non-preemptive multitask OS, an accurate video reproduction synchronizing signal without being restricted by a task scheduling period of the multitask OS.

Further, the exemplary embodiments provide a method of synchronously reproducing a video and an audio, a program to synchronously reproduce a video and an audio, and an apparatus to synchronously reproduce a video and an audio that perform frame update using a video reproduction synchronizing signal, which is generated by the method of generating a video reproduction synchronizing signal, to thereby make extremely accurate lip-sync possible and make management of timer resources easy.

(1) A method of generating a video reproduction synchronizing signal of the exemplary embodiments is a method of generating a video reproduction synchronizing signal that generates a video reproduction synchronizing signal to reproduce video data and audio data in synchronization with each other, the method including: acquiring step of acquiring output processing end timing for output to an audio reproducing unit for one-frame equivalent audio data that is equivalent to a display period for one frame of video data; and generating the video reproduction synchronizing signal every time the output processing end timing is acquired.

Therefore, according to the method of generating a video reproduction synchronizing signal of the exemplary embodiments, since a video reproduction synchronizing signal is generated from audio data, it is possible to perform frame update for video data on the basis of only resources of a timer for audio reproduction. This makes extremely accurate lip-sync possible and makes management of timer resources easy.

Note that, in the exemplary embodiments, the output processing end timing for output to the audio reproducing unit means, for example, end timing of processing to output audio data to a D/A converter provided in the audio reproducing unit. Note that a frame of a video in the exemplary embodiments include a concept of a field in a video format of an interlace system. An audio in the exemplary embodiments includes not only a human voice but also all kinds of sounds.

(2) In the method of generating a video reproduction synchronizing signal of the exemplary embodiments, the acquiring includes acquiring timing, at which a count value of the number of output samples of audio data outputted to the audio reproducing unit is a predetermined value, as the output processing end timing.

By adopting such a method, if the predetermined value is set to the number of output samples included in the "one-frame equivalent audio data", it is possible to generate a video reproduction synchronizing signal, which is accurately in synchronization with timing of audio reproduction for each frame of video data.

(3) In the method of generating a video reproduction synchronizing signal of the exemplary embodiments, the acquiring includes timing, at which a flag set in a predetermined position of audio data outputted to the audio reproducing unit is detected, as the output processing end timing.

By adopting such a method, if a position for setting the flag is set in an end position of the "one-frame equivalent audio data", it is possible to generate a video reproduction synchronizing signal, which is accurately in synchronization with timing of audio reproduction for each frame of video data.

(4) In the method of generating a video reproduction synchronizing signal of the exemplary embodiments, in the acquiring timing, at which a block of the one-frame equivalent audio data is transferred to the audio reproducing unit, as the output processing end timing.

By adopting such a method, timing, at which the block is transferred to the audio reproducing unit, is output processing end timing of the "one-frame equivalent audio data" outputted to the audio reproducing unit. Thus, it is possible to generate a video reproduction synchronizing signal, which is in synchronization with timing of audio reproduction accurately, for each frame of video data.

In this case, it is possible to calculate a size of the block from the number of output samples of audio data, the number of quantized bits, and the number of output channels.

(5) It is also possible to apply the method of generating a video reproduction synchronizing signal of the exemplary embodiments to a case in which the video reproduction synchronizing signal is generated using a non-preemptive multitask operating system.

Therefore, even when video audio synchronizing reproduction is performed using the non-preemptive multitask OS, there is also an advantage that it is possible to generate an accurate video reproduction synchronizing signal without being restricted by a task scheduling period of the multitask OS.

(6) In the method of generating a video reproduction synchronizing signal of the exemplary embodiments, the acquiring includes timing, at which a blocking mode set on the basis of a system call issued at the time when the one-frame equivalent audio data is transferred to the audio reproducing unit as a block is canceled according to end of the transfer of the block of the one-frame equivalent audio data, as the output processing end timing.

By adopting such a method, it is possible to acquire output processing end timing at more precise timing than a period of task scheduling. Thus, it is possible to generate a video reproduction synchronizing signal, which is accurately in synchronization with timing of audio reproduction for each frame of video data.

(7) The method of generating a video reproduction synchronizing signal of the further includes setting the number of output samples of one-frame equivalent audio data for each frame of video data, and the acquiring including executing for each frame of video data on the basis of the output samples set by the setting.

By adopting such a method, even when a sampling rate of audio data and a frame rate of video data are not expressed as ratios of whole numbers, it is possible to prevent deviation of lip-sync from occurring even when a video and an audio are reproduced for a long time by setting the number of output samples of audio data appropriately for each frame of video data.

(8) In the method of generating a video reproduction synchronizing signal of the exemplary embodiments, the setting includes determining the number of output samples such that an average value of the number of output samples is equal to or approximate to a predetermined value.

By adopting such a method, it is possible to make the number of output samples of audio data, which are averaged at a long span, equal to or approximate to an ideal number of output samples equivalent to a display period for one frame of video data. Thus, it is possible to prevent deviation of lip-sync from occurring even when a video and an audio are reproduced for a long time.

(9) In the method of generating a video reproduction synchronizing signal of the exemplary embodiments, the determining includes using Bresenham's algorithm.

By adopting such a method, it is possible to set the number of output samples of the "one-frame equivalent audio data" appropriately while minimizing jitter.

(10) In the method of generating a video reproduction synchronizing signal of the exemplary embodiments, the setting includes determining the number of output samples by referring to a table describing rules to determine the number of output samples on the basis of a sampling rate of audio data and a frame rate of video data.

By adopting such a method, it is possible to set the number of output samples of the "one-frame equivalent audio data" appropriately with a small arithmetic operation amount by determining the number of output samples of the "one-frame equivalent audio data" for each frame of video data with reference to the table.

(11) A computer readable medium having a program to generate a video reproduction synchronizing signal of the exemplary embodiments, the program including causing a timing control apparatus, which generates a video reproduction synchronizing signal to reproduce video data and audio data in synchronization with each other, to execute: acquiring output processing end timing for output to an audio reproducing unit for one-frame equivalent audio data that is equivalent to a display period for one frame of video data; and generating the video reproduction synchronizing signal every time the output processing end timing is acquired.

Therefore, it is possible to perform frame update for video data on the basis of only resources of a timer for audio reproduction by actuating the timing control apparatus using the program to generate a video reproduction synchronizing signal of the exemplary embodiments. This makes extremely accurate lip-sync possible and makes management of timer resources easier.

(12) A timing control apparatus of the exemplary embodiments is a timing control apparatus that generates a video reproduction synchronizing signal to reproduce video data and audio data in synchronization with each other, the timing control apparatus including a device that acquires output processing end timing for output to an audio reproducing unit for one-frame equivalent audio data that is equivalent to a display period for one frame of video data; and a device that generates the video reproduction synchronizing signal every time the output processing end timing is acquired.

Therefore, according to the timing control apparatus of the exemplary embodiments, since a video reproduction synchronizing signal is generated from audio data, it is possible to perform frame update for video data on the basis of only resources of a timer for audio reproduction by generating a video reproduction synchronizing signal using the timing control apparatus of the exemplary embodiments. This makes extremely accurate lip-sync possible and makes management of timer resources easier.

(13) A method of synchronously reproducing a video and an audio of the exemplary embodiments to reproduce video data and audio data in synchronization with each other, includes: acquiring output processing end timing for output to an audio reproducing unit for one-frame equivalent audio data that is equivalent to a display period for one frame of video data; generating the video reproduction synchronizing signal every time the output processing end timing is acquired; and performing frame update for video data according to the video reproduction synchronizing signal.

Therefore, according to the method of synchronously reproducing a video and an audio of the exemplary embodiments since a video reproduction synchronizing signal is generated from audio data and synchronous reproduction of a video and an audio is performed using this video reproduction synchronizing signal, it is possible to perform frame update for video data on the basis of only resources of a timer for audio reproduction. This makes extremely accurate lip-sync possible and makes management of timer resources easier.

(14) A computer readable medium having a program to synchronously reproduce a video and an audio of the exemplary embodiment includes a program for causing an apparatus to synchronously reproduce a video and an audio, which is capable of reproducing video data and audio data in synchronization with each other, to execute: acquiring output processing end timing for output to an audio reproducing unit for one-frame equivalent audio data that is equivalent to a display period for one frame of video data; generating the video reproduction synchronizing signal every time the output processing end timing is acquired; and performing frame update for video data according to the video reproduction synchronizing signal.

Therefore, it is possible to perform frame update for video data on the basis of only resources of a timer for audio reproduction by performing synchronous reproduction of a video and an audio using the program to synchronously reproduce a video and an audio of the exemplary embodiment. This makes extremely accurate lip-sync possible and makes management of timer resources easier.

(15) An apparatus to synchronously reproduce a video and an audio of the invention is an apparatus for synchronously reproducing a video and an audio that is capable of reproducing video data and audio data in synchronization with each other, the apparatus including: an audio reproducing unit that performs audio reproduction processing on the basis of audio data; a video reproducing unit that performs video reproduction processing on the basis of video data; and a timing control unit that acquires output processing end timing for output to an audio reproducing unit for one-frame equivalent audio data that is equivalent to a display period for one frame of video data and generates the video reproduction synchronizing signal every time the output processing end timing is acquired; the video reproducing unit performing frame update on the basis of the video reproduction synchronizing signal.

Therefore, according to the apparatus to synchronously reproduce a video and an audio of the exemplary embodiments, it is possible to perform frame update for video data on the basis of only resources of a timer for audio reproduction. This makes extremely accurate lip-sync possible and makes management of timer resources easier. Thus, the third object of the invention is attained.

BRIEF DESCRIPTION OF THE DRAWINGS

FIG. 12 is a table of an example of a result of obtaining the number of output samples equivalent to respective frames using an algorithm of Bresenham for each frame of a video of an exemplary embodiment;

FIG. 13 is a schematic of an example of a table that makes it possible to refer to rules determined in advance on the basis of a frame rate and a sampling rate of an exemplary embodiment;

DETAILED DESCRIPTION OF EMBODIMENTS

The exemplary embodiments will be hereinafter explained in detail on the basis of respective embodiments.

First Exemplary Embodiment

Figure 1:
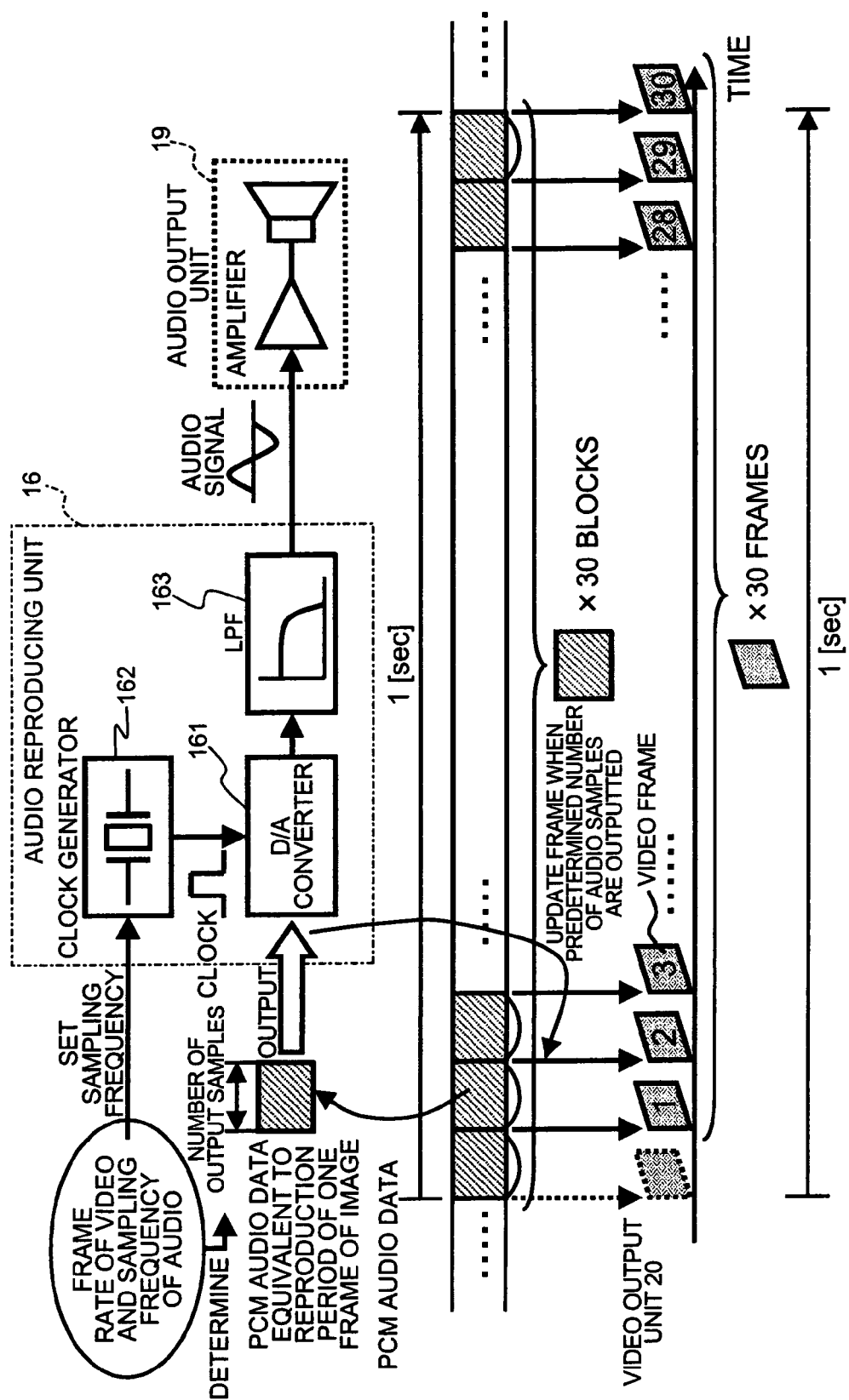
FIG. 1 is a schematic to explain a basic concept of the exemplary embodiments.

FIG. 1 is a schematic to explain a basic concept of the exemplary embodiments.

In a method of generating a video reproduction synchronizing signal of the embodiments of FIG. 1, a video reproduction synchronizing signal to perform frame update for video data is outputted at a timing when PCM (Pulse Code Modulation) audio data equivalent to a display period for one frame of video data (equivalent to "one-frame equivalent audio data") is outputted to an audio reproducing unit (this is referred to as output processing end timing). Note that, in a first exemplary embodiment, the output processing end timing for output to the audio reproducing unit 16 is set as output processing end timing of audio data outputted to a D/A converter 161 provided in the audio reproducing unit 16.

In a specific example, it is assumed that a frame rate of video data is 30 [frame/sec] and a sampling rate of PCM audio data (hereinafter simply referred to as "audio data") is 44.1 [KHz]. In this case, 1470 [sample] obtained by dividing the sampling rate of the audio data by the frame rate of the video data is set as one block of the audio data. A video reproduction synchronizing signal to perform frame update for the video data is outputted at timing when the block of the audio data of 1470 [sample] is outputted to the D/A converter 161. On a video reproducing unit 17 (see FIG. 2) side, frame update is performed using this video reproduction synchronizing signal.

This makes it possible to generate a video reproduction synchronizing signal on the basis of only resources of a timer for audio reproduction. Therefore, on the video reproducing unit 17 side, since frame update is performed using this video reproduction synchronizing signal, highly accurate lip-sync is made possible. In addition, since resources of a timer only have to be prepared on an audio reproduction side, it is possible to simplify management of the resources of the timer.

Figure 2:
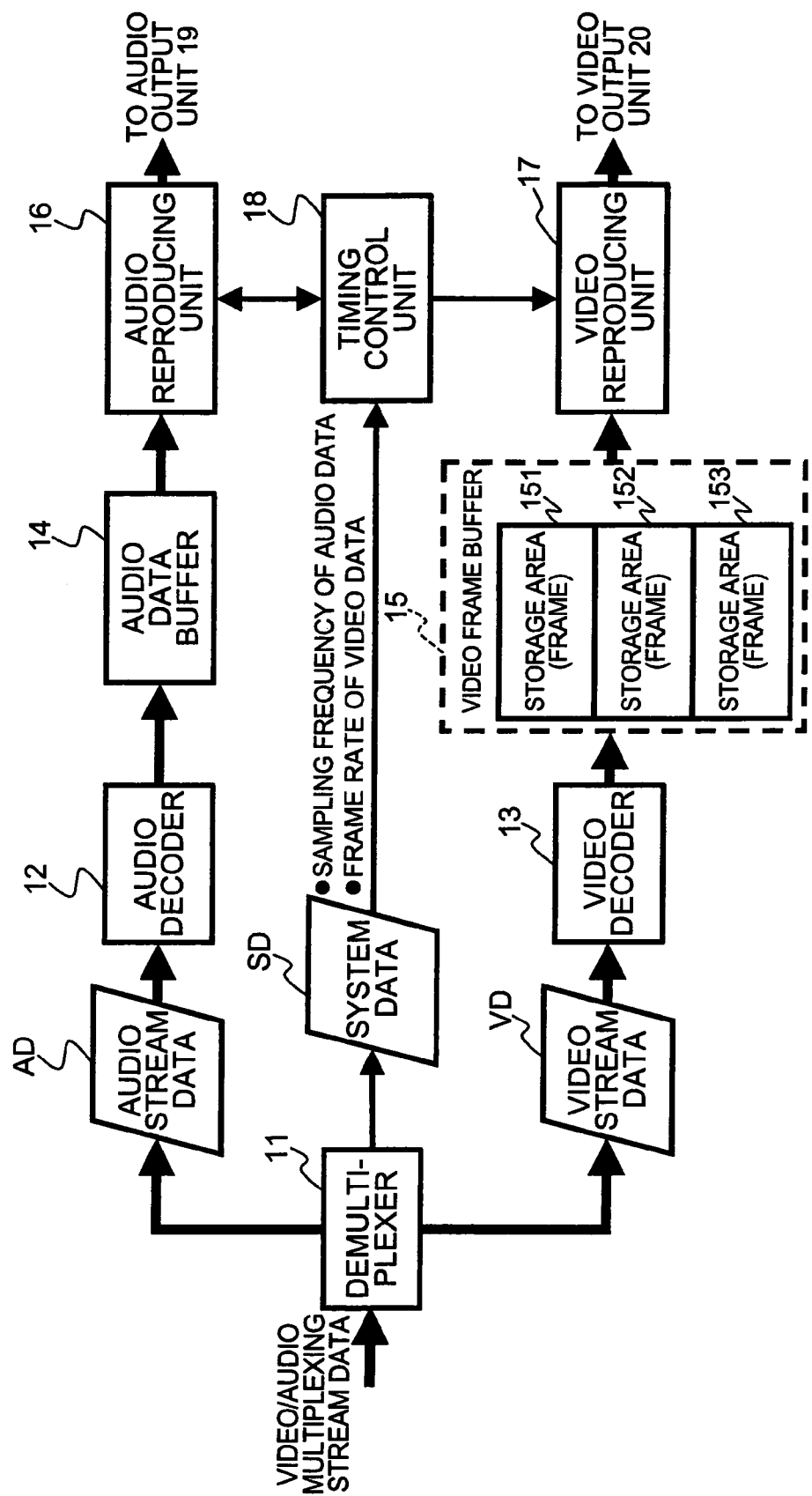
FIG. 2 is a schematic to explain functions of an apparatus for synchronously reproducing a video and an audio of the exemplary embodiments.

FIG. 2 is a schematic to explain functions of an apparatus to synchronously reproduce a video and an audio of the exemplary embodiments. The apparatus to synchronously reproduce a video and an audio includes: a demultiplexer 11 that has a function of separating video/audio multiplexing stream data into audio stream data AD, video stream data VD, and system data SD; an audio decoder 12 that decodes the audio stream data AD; a video decoder 13 that decodes the video stream data VD; an audio data buffer 14 that stores audio data after decoding; a video frame buffer 15 that stores video data after decoding by a unit of frame; an audio reproducing unit 16 that sequentially inputs and reproduces the audio data stored in the audio data buffer 14; a video reproducing unit 17 that sequentially inputs and reproduces the video data stored in the video frame buffer 15; a timing control unit 18 that performs timing control for synchronizing an audio and a video; an audio output unit 19 that outputs an audio signal, which is subjected to audio reproduction processing in the audio reproducing unit 16, as an audio; and a video output unit 20 that outputs a video signal, which is subjected to video reproduction processing in the video reproducing unit 17, as a video.

The audio data buffer 14 has a function of FIFO, such as a ring buffer. The audio data is stored in the audio data buffer 14 in a linear PCM format. The video frame buffer 15 has, for example, storage areas 151 to 153 capable of storing video data for three frames for each frame.

As shown in FIG. 1, the audio reproducing unit 16 has a D/A converter 161, a clock generator 162, and a low-pass filter (LPF) 163, and is connected to the audio output unit 19.

The timing control unit 18 has a function of setting the number of output samples of audio data equivalent to a display period for one frame of a video on the basis of the system data SD (a sampling rate, a frame rate, etc.) from the demultiplexer 11 and a clock from the clock generator 162 of the audio reproducing unit 16. In addition, the timing control unit 18 has a function of acquiring output processing end timing (this output processing end timing will be described later) for output to the D/A converter 161 for audio data equivalent to a display period for one frame of video data, generating a video reproduction synchronizing signal every time the output processing end timing is acquired, and outputting the video reproduction synchronizing signal to the video reproducing unit 17. Specific operations of this timing control unit 18 will be explained later.

The video reproducing unit 17 outputs a signal for frame update to the video output unit 20 according to a video reproduction synchronizing signal.

Figure 3:
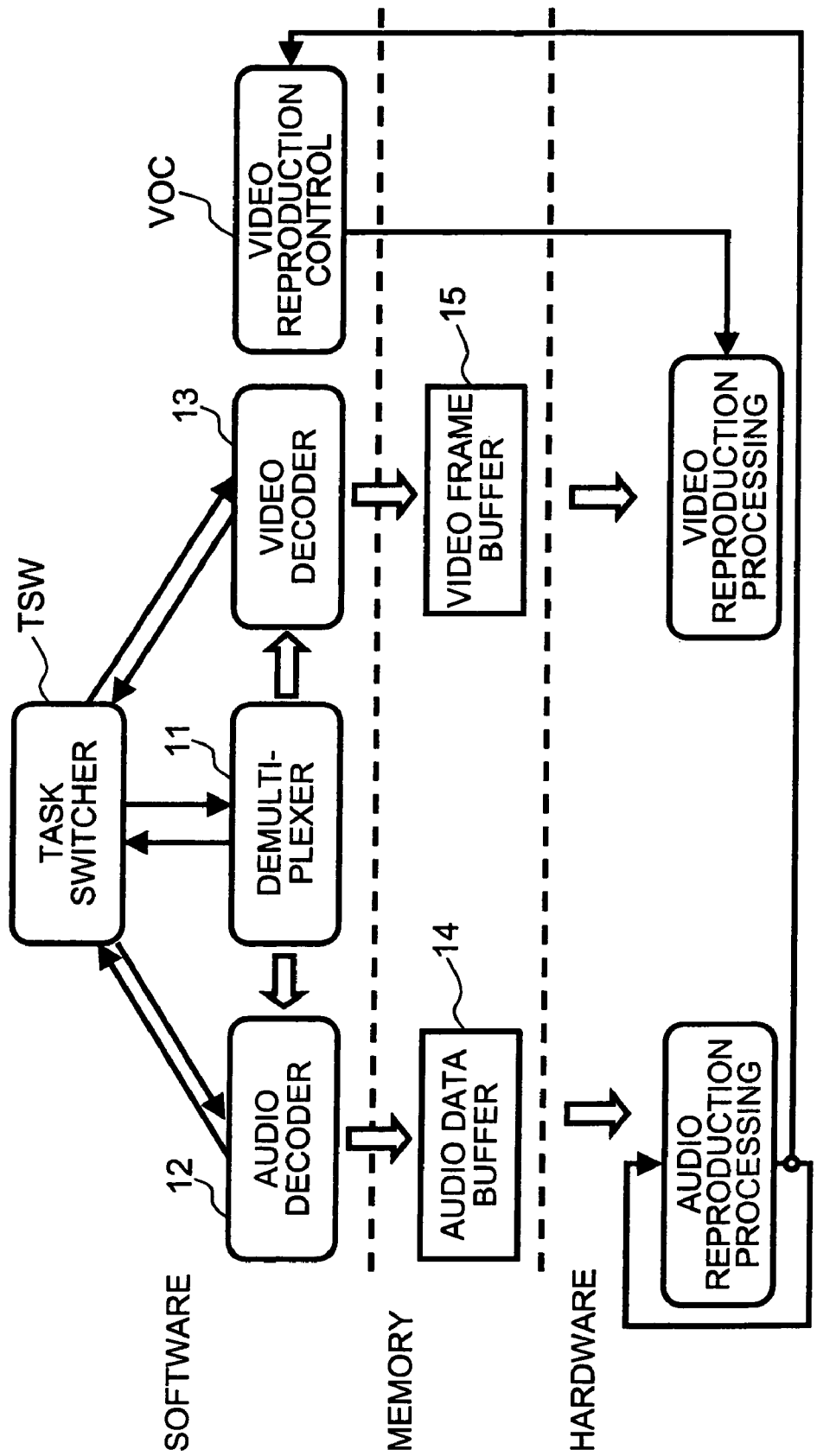
FIG. 3 is a schematic to explain an operation concept of an apparatus to synchronously reproduce a video and an audio according to a first exemplary embodiment.

FIG. 3 is a schematic to explain an operation concept of an apparatus to synchronously reproduce a video and an audio according to the first exemplary embodiment. A task switcher TSW has a simple task scheduling function. In an example of FIG. 3, the task switcher TSW switches operations of the demultiplexer 11, the audio decoder 12, and the video decoder 13. For example, if an operation privilege is given to the audio decoder 12, an operation to write audio data in the audio data buffer 14 by the audio decoder 12 is made possible. If an operation privilege is given to the video decoder 13, an operation to write video data in the video frame buffer 15 is made possible.

When audio reproduction processing for audio data, which corresponds to a display period for one frame of video data, of the audio data written in the audio data buffer 14 is performed, processing shifts to video reproduction control VOC. A video frame is updated and video reproduction processing for video data for one frame written in the video frame buffer 15 is performed.

Figure 4:
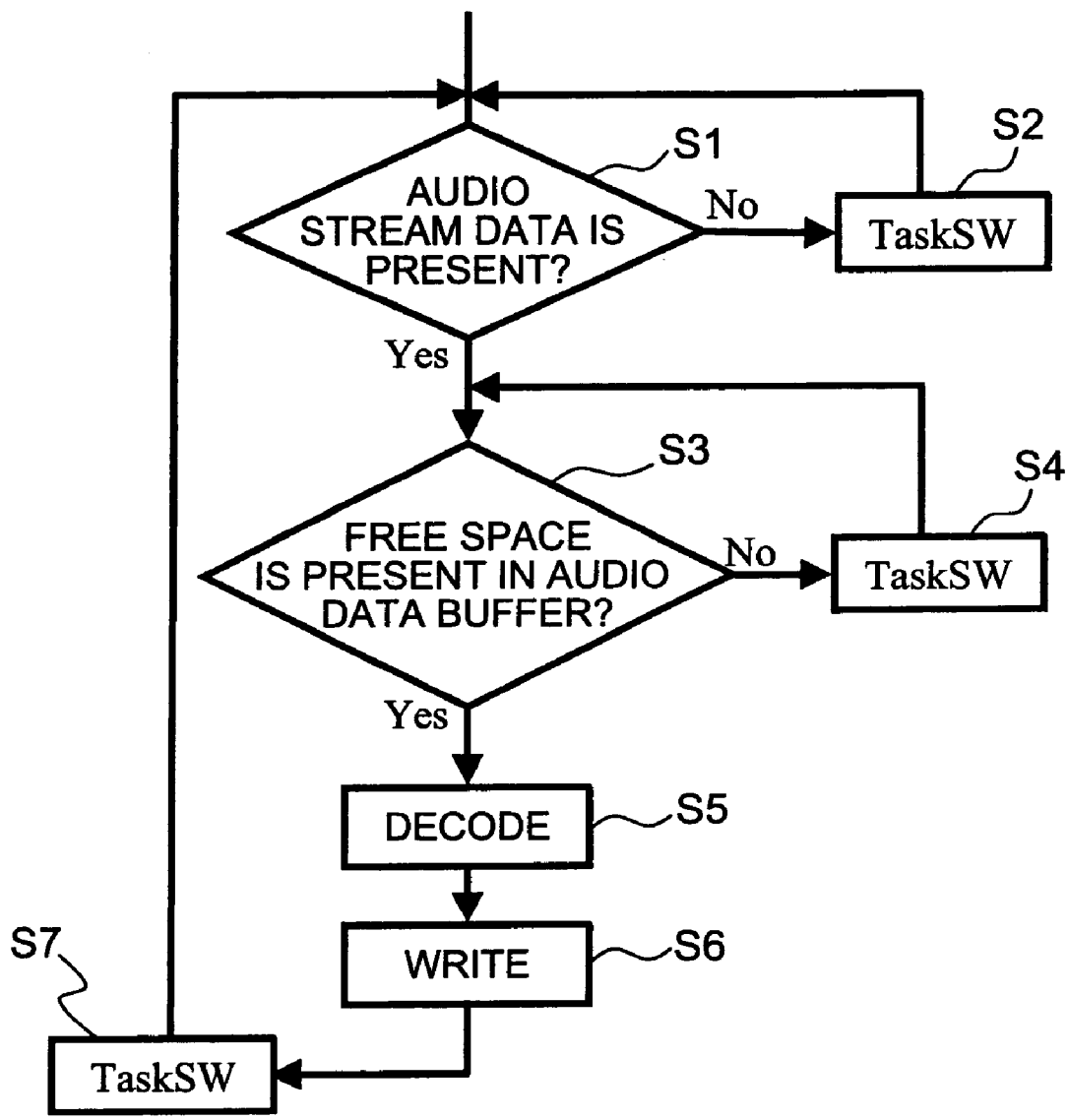
FIG. 4 is a flowchart to explain a processing procedure of an audio decoder 12 of an exemplary embodiment.
Figure 15:
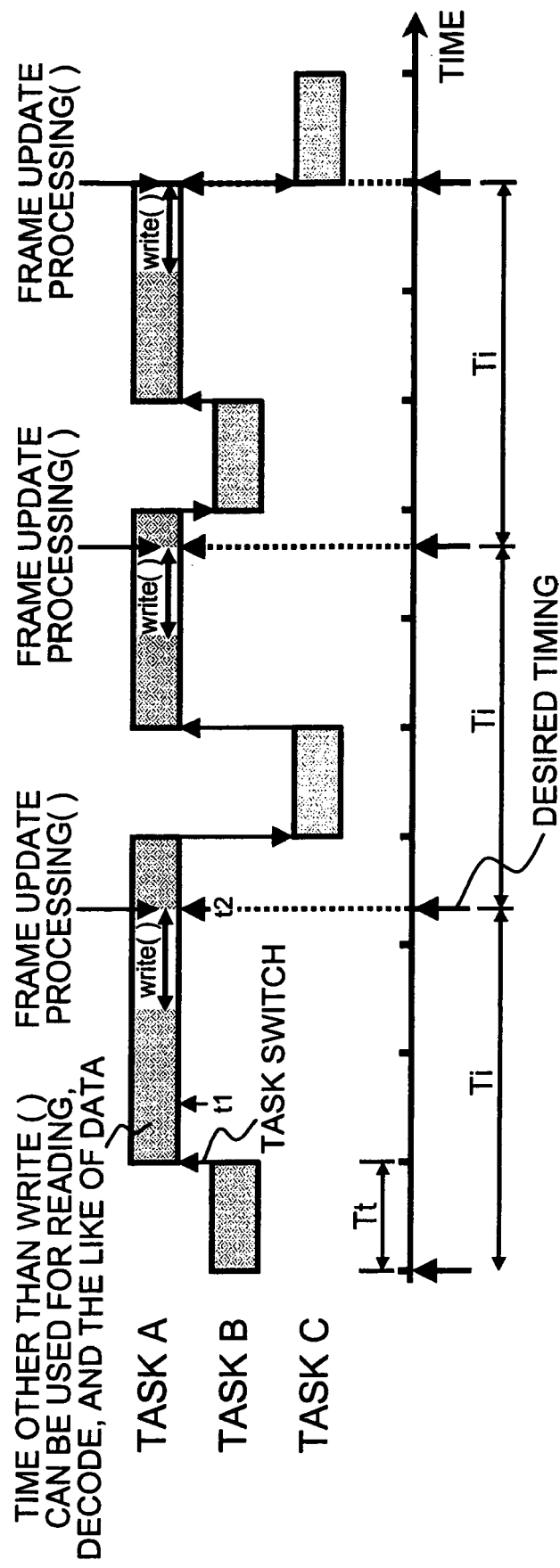
FIG. 15 is a schematic to explain a method of using a non-preemptive multitask OS to obtain a precise task scheduling period making use of an audio output of an exemplary embodiment.

FIG. 4 is a flowchart to explain a processing procedure of the audio decoder 12. FIG. 15 is a flowchart to explain a processing procedure of the video decoder 13.

As shown in FIG. 4, the audio decoder 12 judges whether audio stream data AD is present (step S1). If audio stream data AD is not present, the audio decoder 12 returns processing to the task switcher TSW (represented as "Task SW" in FIGS. 4 and 5) (step S2). If audio stream data AD is present, the audio decoder 12 judges whether there is a free space in the audio data buffer 14 (step S3).

In this judgment, if there is no free space in the audio data buffer 14, the audio decoder 12 returns the processing to the task switcher TSW (step S4). If there is a free space in the audio data buffer 14, the audio decoder 12 performs decoding (step S5) and writes audio data after the decoding in the audio data buffer 14 (step S6). Then, the audio decoder 12 returns the processing to the task switcher TSW (step S7).

Note that returning the processing to the task switcher TSW means that the audio decoder 12 passes a privilege for task processing to a unit other than the audio decoder 12 itself (in this example, the demultiplexer 11 or the video decoder 13). In other words, in the case of FIG. 4, the processing is switched from the audio decoder 12 to the demultiplexer 11 or the video decoder 13 by the task switcher TSW. In FIG. 4, an arrow returning from the task switcher TSW means that the privilege for task processing shifts to the audio decoder 12. The same holds true in FIG. 5.

Figure 5:
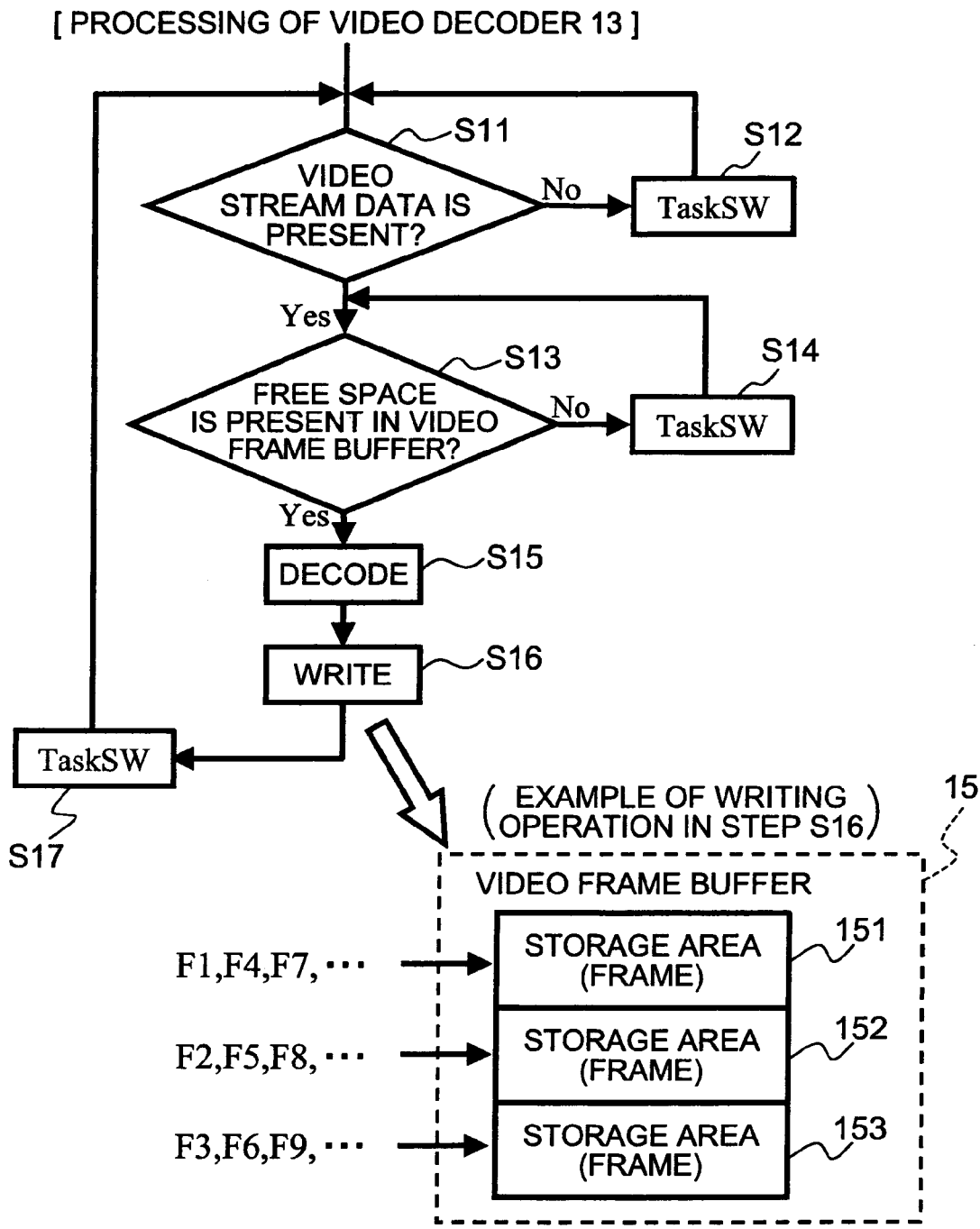
FIG. 5 is a flowchart to explain a processing procedure of a video decoder 13 of an exemplary embodiment.

On the other hand, as shown in FIG. 5, first, the video decoder 13 judges whether video stream data VD is present (step S11). If video stream data VD is not present, the video decoder 13 returns processing to the task switcher TSW (step S12). If video stream data VD is present, the video decoder 13 judges whether there is a free space in the video frame buffer 15 (step S13).

In this judgment, if there is no free space in the video frame buffer 15, the video decoder 13 returns the processing to the task switcher TSW (step S114). If there is a free space in the video frame buffer 15, the video decoder 13 performs decoding (step S15) and writes a frame after the decoding in the free space of the video frame buffer 15 (step S16). Then, the video decoder 13 returns the processing to the task switcher TSW (step S17).

Note that, as the writing of video data in the video frame buffer 15 (as indicated as an example of a writing operation in step S16 in FIG. 5, for example) if respective frames of the video data are represented as frames F1, F2, F3, and so on, the frames are written in storage areas 151 to 153, in order, in the following manner. First, the frame F1 is written in the free storage area 151 (in this case, it is assumed that all three storage areas 151 to 153 are free spaces as an initial state), next, the frame F2 is written in the storage area 152, and, next, the frame F3 is written in the storage area 153.

The video data written in the storage areas 151 to 153 are sequentially outputted in an order of the frame F1, the frame F2, and so on. Thus, the storage areas 151, 152, and so on, change to free spaces in this order. Therefore, the frames are written in the storage areas 151 to 153, in order, in such a manner that the frame F4 is written in the storage area 151 and the frame F5 is written in the storage area 152.

Figure 6:
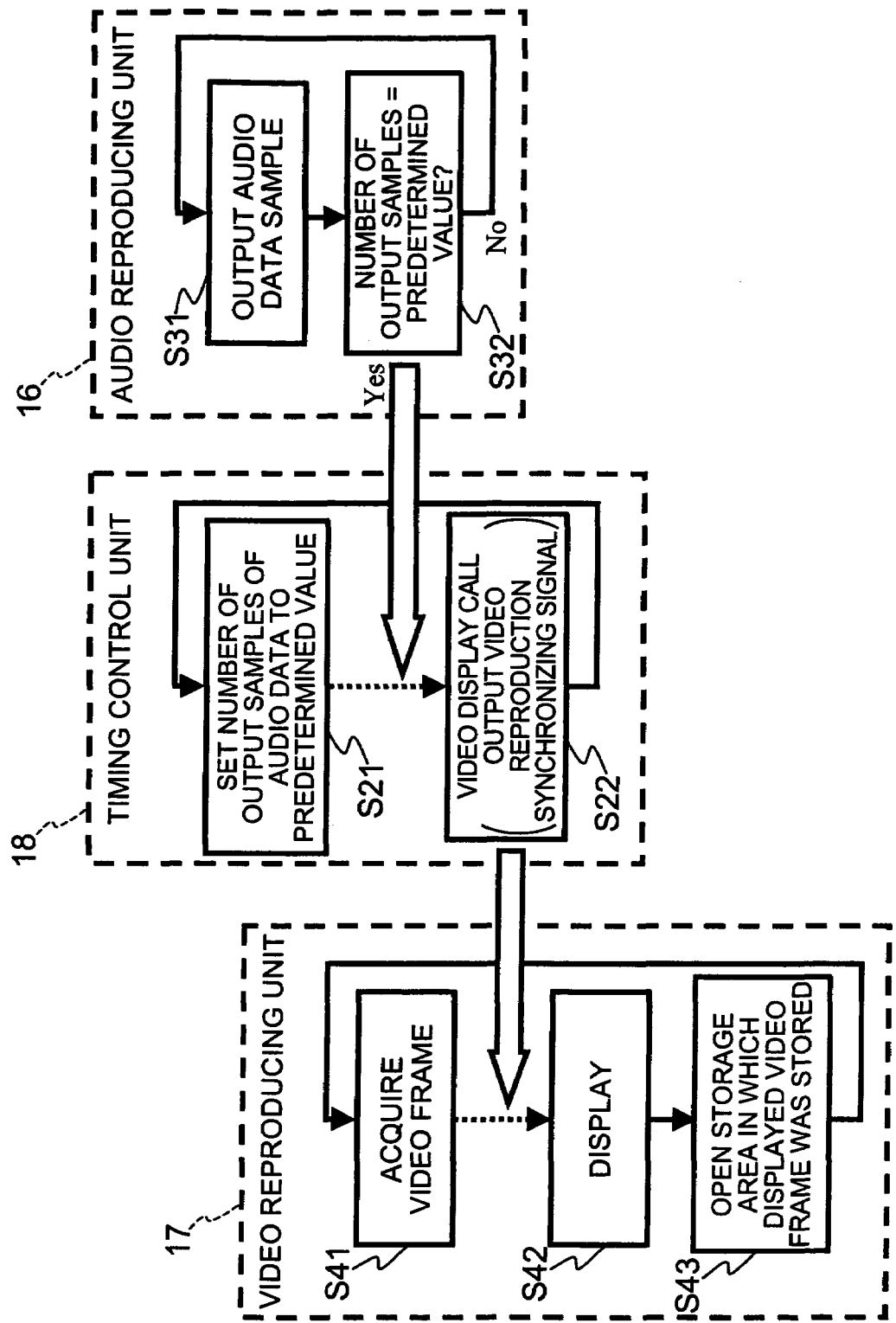
FIG. 6 is a schematic to explain a first method of generating a video reproduction synchronizing signal based on audio reproduction processing of an audio reproducing unit of an exemplary embodiment.
Figure 7:
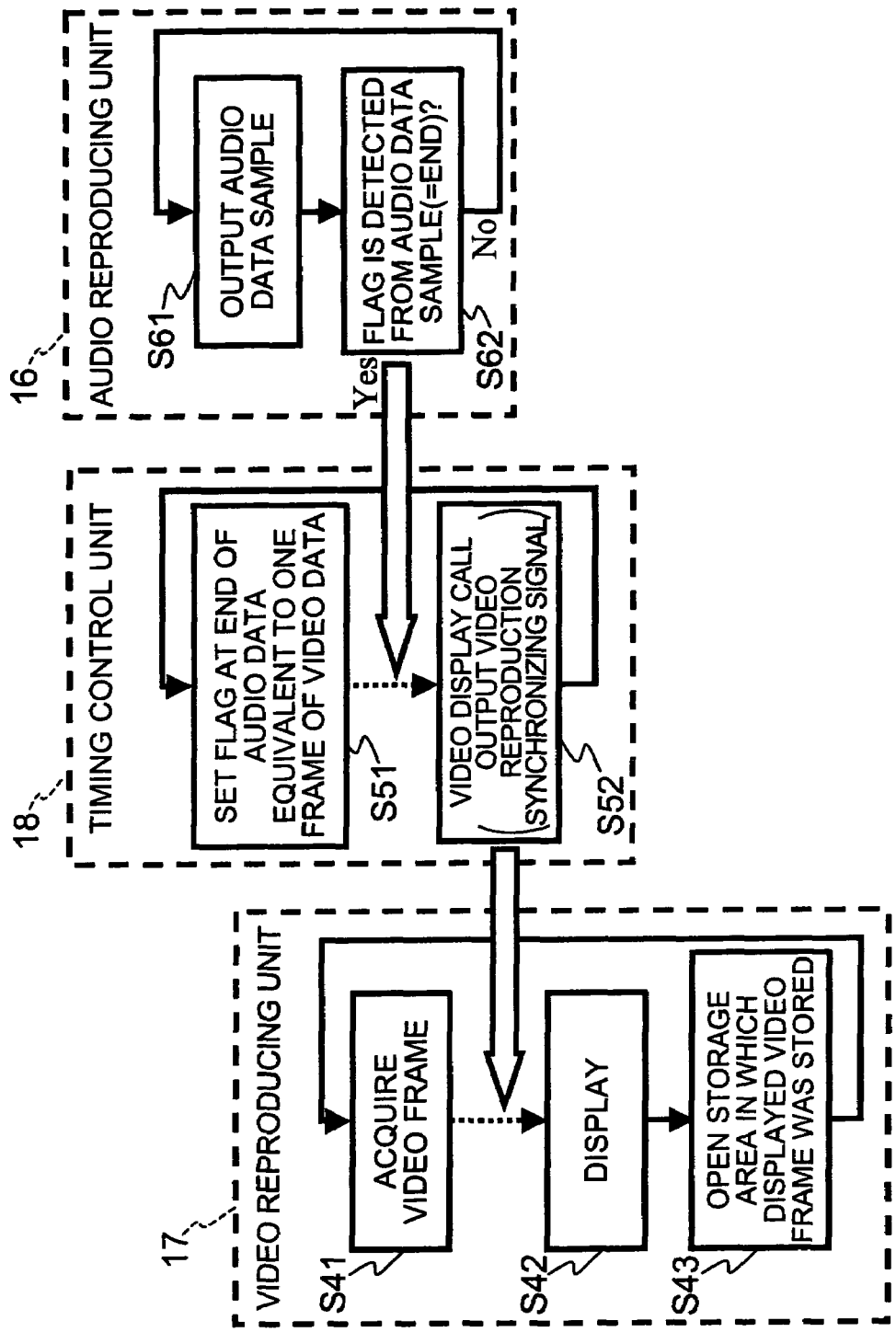
FIG. 7 is a schematic to explain a second method of generating a video reproduction synchronizing signal based on audio reproduction processing of an audio reproducing unit of an exemplary embodiment.
Figure 8:
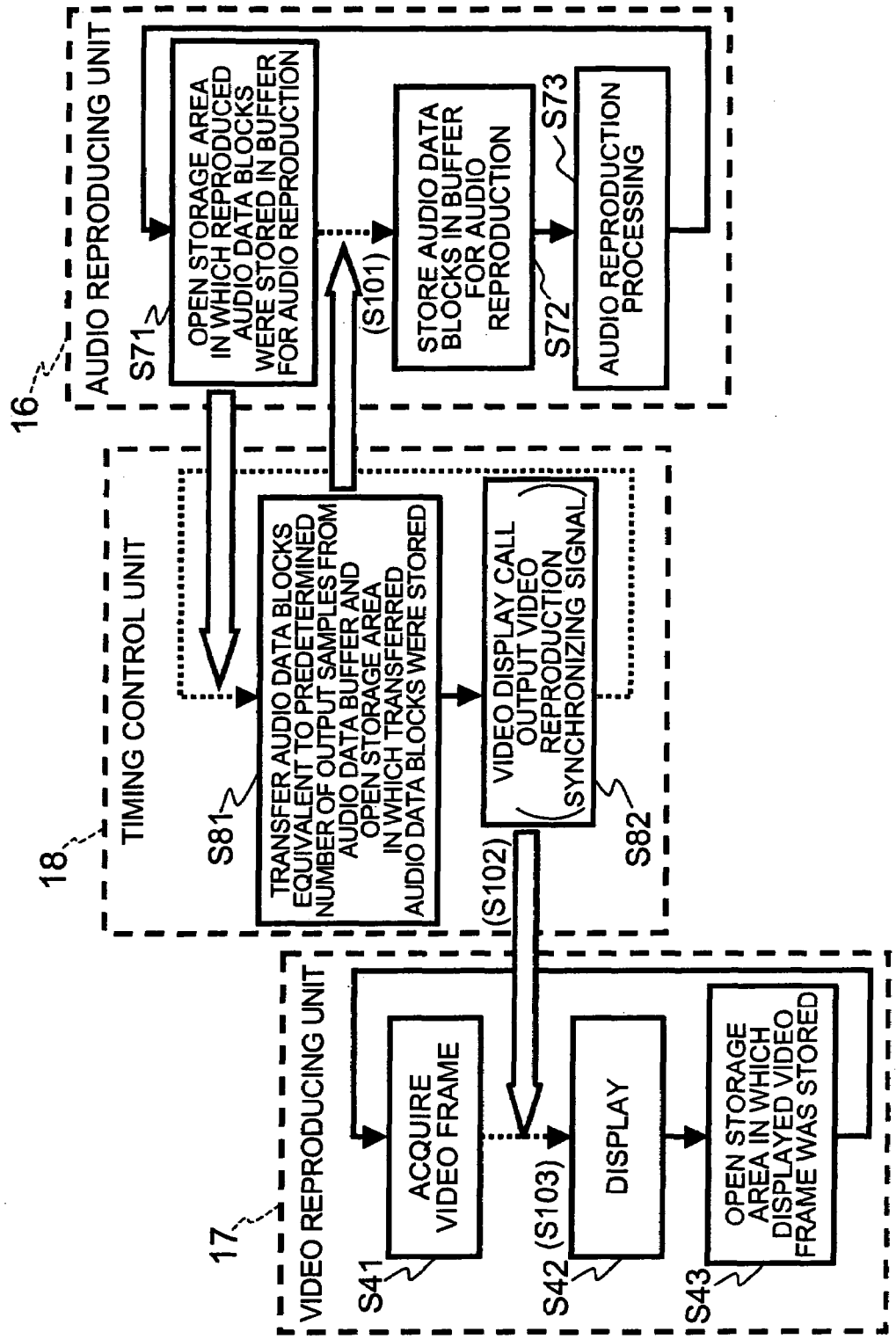
FIG. 8 is a schematic to explain a third method of generating a video reproduction synchronizing signal based on audio reproduction processing of an audio reproducing unit of an exemplary embodiment.

FIGS. 6 to 8 are schematics to explain methods of generating a video reproduction synchronizing signal based on the audio reproduction processing of the audio reproducing unit 16. Note that the method shown in FIG. 6 is referred to as a first method of generating a video reproduction synchronizing signal, the method shown in FIG. 7 is referred to as a second method of generating a video reproduction synchronizing signal, and the method shown in FIG. 8 is referred to as a third method of generating a video reproduction synchronizing signal.

First, the first method of generating a video reproduction synchronizing signal will be explained with reference to FIG. 6.

In FIG. 6, the timing control unit 18 sets the number of output samples of audio data to a predetermined value (step S21). This predetermined value is the number of output samples of audio data equivalent to one frame of video data (one-frame equivalent audio data).

The audio reproducing unit 16 outputs an audio data sample to the D/A converter 161 (step S31) and judges whether the number of outputted samples (which is referred to as the number of output samples) has reached the predetermined value set by the timing control unit 18 (step S32). As a result of the judgment, it is judged that a count value of the number of output samples has reached the predetermined value, and the audio reproducing unit 16 outputs a signal (which indicates that the number of output samples has reached the predetermined value) to the timing control unit 18.

When the timing control unit 18 receives the signal, which indicates that the number of output samples has reached the predetermined value, from the audio reproducing unit 16, the timing control unit 18 generates a video reproduction synchronizing signal, applies video display call (outputs a video reproduction synchronizing signal) to the video reproducing unit 17 (step S22), and returns to step S21.

In this way, the timing control unit 18 acquires timing, at which a predetermined number of output samples are outputted to the D/A converter 161 by the audio reproducing unit 16 as output processing end timing for audio data equivalent to a display period for one frame of video data. The timing control unit generates a video reproduction synchronizing signal every time the output processing end timing is acquired, and outputs the video reproduction synchronizing signal to the video reproducing unit 17.

When the video reproducing unit 17 receives the video display call (the video reproduction synchronizing signal) from the timing control unit 18, the video reproducing unit 17 displays the video frame acquired in step S41 and, then, opens a certain one storage area of the video frame buffer 15 in which the displayed video frame was stored (steps S42 and S43).

It is assumed that the audio decoder 12 and the audio reproducing unit 16 operate asynchronously, and that the video decoder 13 and the video reproducing unit 17 operate asynchronously. However, the audio decoder 12 and the video decoder 13 are controlled such that buffer under-run/overrun does not occur in the audio data buffer 14 and the video frame buffer 15. The same holds true in FIGS. 7 and 8 described below.

In this way, in the first method of generating a video reproduction synchronizing signal, a video reproduction synchronizing signal is outputted to the video reproducing unit 17 every time the number of outputs samples of audio data outputted to the D/A converter 161 reaches a preset value. The video reproducing unit 17 performs frame update for video data according to this video reproduction synchronizing signal.

Specifically, for example, when a frame rate of video data is 30 [frame/sec] and a sampling rate of audio data is 44.1 [KHz], a frame of the video data is updated every time the number of output samples (1470 [sample]) of the audio data equivalent to a display period for one frame of the video data is outputted to the D/A converter 161 of the audio reproducing unit 16. Consequently, it is possible to extremely accurately synchronize a video and an audio.

In this way, according to the first video reproduction synchronizing signal, the number of output samples of audio data outputted to the D/A converter 161 is counted and frame update for video data is performed at timing when the count number has reached a value set in advance. Thus, synchronous reproduction of a video and an audio is automatically realized.

Next, the second method of generating a video reproduction synchronizing signal will be explained with reference to FIG. 7.

In FIG. 7, the timing control unit 18 sets a flag in an end position of audio data equivalent to a display period for one frame of video data (step S51). Specifically, for example, the timing control unit 18 sets a flag, which indicates an end, in a specific bit that does not directly affect an audio in the audio data. The audio reproducing unit 16 outputs an audio data sample to the D/A converter 161 (step S61) and judges whether the flag set by the timing control unit 18 has been detected (step S62). As a result of this judgment, if it is judged that the flag is detected, the audio reproducing unit 16 outputs a signal, which indicates that the flag has been detected, to the timing control unit 18.

When the timing control unit 18 receives a signal, which indicates that the flag has been detected from the audio reproducing unit 16, the timing control unit 18 generates a video reproduction synchronizing signal, applies video display call (outputs the video reproduction synchronizing signal) to the video reproducing unit 17 (step S52), and returns to step S51.

In this way, the timing control unit 18 acquires timing (at which the audio reproducing unit 16 detects the flag from the audio data outputted to the D/A converter 161) as output processing end timing of the audio data equivalent to a display period for one frame of video data, generates a video reproduction synchronizing signal every time the output processing end timing is acquired, and outputs the video reproduction synchronizing signal to the video reproducing unit 17.

When the video reproducing unit 17 receives the video display call (the video reproduction synchronizing signal) from the audio reproducing unit 16, as in the case of FIG. 6, the video reproducing unit 17 displays the video frame acquired in step S41 and, then, opens a certain one storage area of the video frame buffer 15 in which the displayed video frame was stored (steps S42 and S43).

In the second method of generating a video reproduction synchronizing signal, when a flag, which indicates an end, is detected from audio data equivalent to display period for one frame of a video, a video reproduction synchronizing signal is outputted to the video reproducing unit 17. The video reproducing unit 17 performs frame update for video data according to this video reproduction synchronizing signal.

Specifically, for example, when a frame rate of video data is 30 [frame/sec] and a sampling rate of audio data is 44.1 [KHz], a flag, which indicates an end of the audio data, is set for every number of output samples (1470 [sample]) equivalent to a display period for one frame of the video data. Then, a frame of the video data is updated every time the flag indicating the end is detected. Consequently, it is possible to extremely accurately synchronize a video and an audio.

According to the second method of generating a video reproduction synchronizing signal, it is possible to detect a predetermined data unit of audio data without counting the number of output samples. This can be realized by using an "sentinel method" or the like.

Next, the third method of generating a video reproduction synchronizing signal will be explained with reference to FIG. 8.

As shown in FIG. 8, in the third method of generating a video reproduction synchronizing signal, frame update for video data is performed at a timing when blocks of audio data (hereinafter referred to as audio data blocks), equivalent to a predetermined number of output samples, are transferred from the audio data buffer 14 to a buffer for audio reproduction of the audio reproducing unit 16.

In order to realize the third method of generating a video reproduction synchronizing signal, it is preferable to adopt a buffer structure in which two stages of buffers for audio data are provided. A two stage buffer structure, which includes an audio data buffer 14 to store audio data decoded by the audio decoder 12 and a buffer for audio reproduction (not shown) provided on the audio reproducing unit 16 side, is adopted. By adopting such a two stage buffer structure, it is possible to reproduce audio data without a break.

Note that the buffer for audio reproduction is provided at a pre-stage of the D/A converter 161. It is possible to provide this buffer for audio reproduction in the audio reproducing unit 16 as a dedicated buffer. However, if the audio reproducing unit 16 originally has storing means usable as the buffer for audio reproduction, it is also possible to use the storing means.

In realizing the third method of generating a video reproduction synchronizing signal, it is preferable that the audio data buffer 14 has plural storage areas and audio data blocks can be written in the respective storage areas by a unit of individual blocks. Therefore, in this case, it is assumed that the audio data buffer 14 has, for example, three storage areas 141 to 143 (see FIG. 9) as in the video frame buffer 15.

Figure 9:
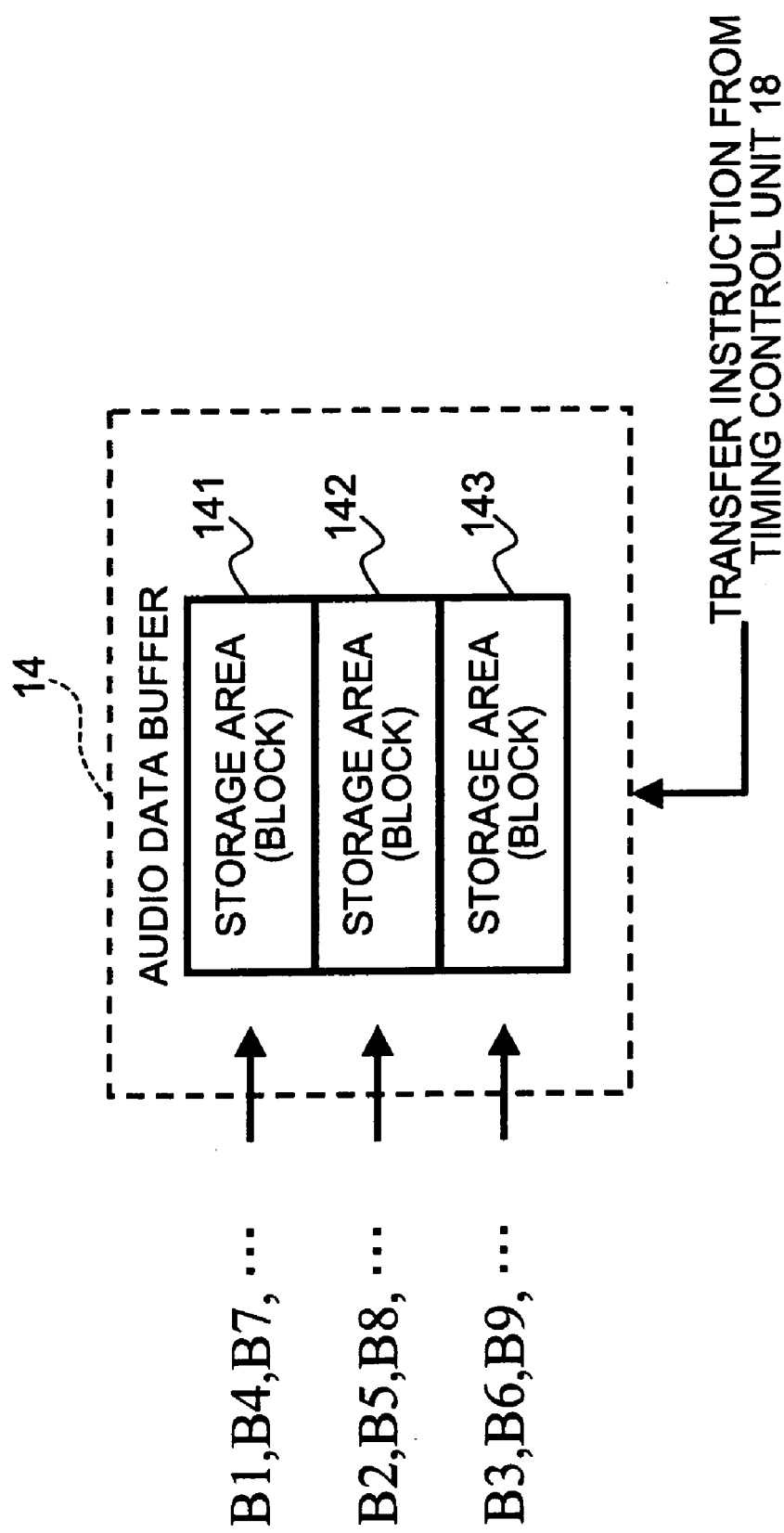
FIG. 9 is a schematic of writing of audio data blocks into an audio data buffer in the third method of generating a video reproduction synchronizing signal.

FIG. 9 is a schematic of writing of audio data blocks in the audio data buffer 14 in the third method of generating a video reproduction synchronizing signal. The writing of audio data blocks in the audio data buffer 14 is performed by the audio decoder 12. An operation for the writing is made possible by the same operation as the writing of respective frames of video data in the respective storage areas 151 to 153 of the video frame buffer 15.

For example, as shown in FIG. 9, if respective audio data blocks of audio data are represented by audio data blocks B1, B2, B3, and so on, the audio data blocks are written in storage areas 141 to 143 in order in the following manner. First, the audio data block B1 is written in the free storage area (in this case, it is assumed that all three storage areas 141 to 143 are free spaces as an initial state) 141, next, the audio data block B2 is written in the storage area 142, and, next, the audio data block B3 is written in the storage area 143. Control for transfer of the audio data blocks B1 to B3, written in the respective storage areas 141 to 143, to the buffer for audio reproduction, is performed according to a transfer instruction from the timing control unit 18.

Referring back to FIG. 8, first, the audio reproducing unit 16 opens a storage area, in which one block of reproduced audio data was stored, of storage areas of the buffer for audio reproduction included in the audio reproducing unit 16 (step S71). This opening of the storage area is performed at a timing when audio data blocks written in the buffer for audio reproduction are outputted to the D/A converter 161.

The timing control unit 18 transfers audio data blocks of a predetermined number of output samples (the number of output samples equivalent to a display period for one frame of video data) from the audio data buffer 14 to the audio reproducing unit 16, and opens storages areas in which the transferred audio data blocks were stored (step S81). Then, the timing control unit 18 sets this timing for transfer of the audio data blocks to the audio reproducing unit 16 as output processing end timing for audio data blocks equivalent to the display period for one frame of the video data. The timing control unit 18 generates a video reproduction synchronizing signal at every output processing end timing, applies video display call (outputs the video reproduction synchronizing signal) to the video reproducing unit 17 (step S82), and returns to step S81.

The audio reproducing unit 16 acquires the audio data blocks transferred from the audio data buffer 14 and stores the audio data blocks in the buffer for audio reproduction of the audio reproducing unit 16 (step S72), performs audio reproduction (step S73), and returns to step S71.

When the video reproducing unit 17 receives the video display call (the video reproduction synchronizing signal) from the timing control unit 18, as in the case of FIG. 6, the video reproducing unit 17 displays the video frame stored in step S41 and, then, opens a certain one storage area of the video frame buffer 15 in which the displayed image frame was stored (steps S42 and S43).

Figure 10:
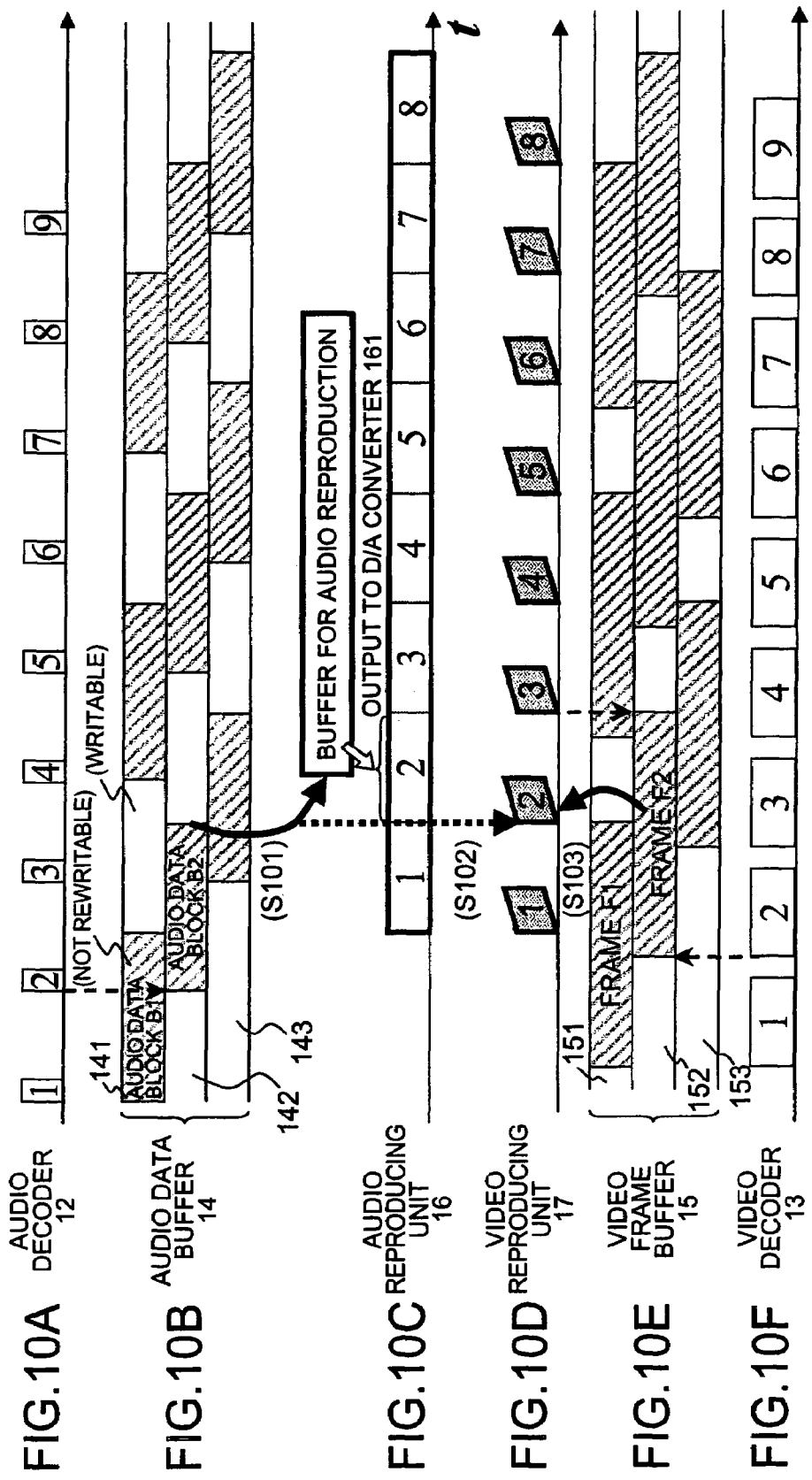
FIG. 10 is a schematic to explain an example of reproduction operations for an audio and a video when the third method of generating a video generation timing is used.

FIG. 10 is a schematic to explain an example of a reproduction operation of an audio and a video at the time when the third method of generating a video reproduction synchronizing signal is used. An abscissa of FIG. 10 indicates time. FIG. 10(A) is a schematic of an audio decode processing task of the audio decoder 12. FIG. 10(F) is a schematic of a video decode processing task of the video decoder 13. Operations of the decoders are switched by the task switcher TSW and the decoders perform decode processing within time allocated by the CPU. Note that, concerning a task of demultiplexing processing, since processing time required for the task is generally shorter than that of a video decode processing task and an audio decode processing task, the task is not specifically described in FIG. 10.

FIG. 10(B) is a schematic of storage states of the three storage areas 141 to 143 in the audio data buffer 14. The decoded audio data blocks B1, B2, and so on are sequentially stored in the storage areas 141, 142, and so on in the following manner. For example, the audio data block B1 decoded by the audio decoder 12 is stored in the storage area 141 and the audio data block B2 decoded by the audio decoder 12 is stored in the storage area 142.

Note that, in FIG. 10(B), shaded parts indicate that data is stored in the respective storage areas 141 to 143 (valid). The storage areas, in which data is stored, are not rewritable and new data cannot be written in the storage areas. The same holds true in the case of the video frame buffer 15 in FIG. 10(E).

On the other hand, on the video decoder 13 side, the respective frames F1, F2, and so on of the decoded video data are sequentially stored in the storage areas 151, 152, and so on, as shown in FIG. 10(E).

The audio data block B2 and the frame F2 of the video data equivalent to the audio data block B2 will be explained as an example. The audio data block B2 after decode processing by the audio decoder 12 is stored in the storage area 142. When the audio data block B2 of the storage area 142 is transferred to the buffer for audio reproduction of the audio reproducing unit 16, as shown in FIG. 10(C) (step S101), video display call is applied (a video reproduction synchronizing signal is outputted) to the video reproducing unit 17 at timing of the transfer (step S102).

Consequently, as shown in FIGS. 10(D) and 10(E), the video reproducing unit 17 displays the frame F2 stored in the video frame buffer 15 (step S103). Steps S101, S102, and S103 in FIG. 10 correspond to steps S101, S102, and S103 in the flowchart of FIG. 8.

Note that, after a display period for the frame F2 of the video data ends, the storage area 152 storing the frame F2 is opened. On the audio reproducing unit 16 side, the storage area 142 storing the audio data block B2 is opened at a stage when the audio data block B2 is transferred to the buffer for audio reproduction side of the audio reproducing unit 16.

In this way, in the third method of generating a video reproduction synchronizing signal, frame update for video data is performed at timing when a block of audio data equivalent to a display period for one frame of video data is transferred from the audio data buffer 14 to the buffer for audio reproduction included in the audio reproducing unit 16. The video reproducing unit 17 performs frame update for video data according to this video reproduction synchronizing signal.

Specifically, for example, when a frame rate of video data is 30 [frame/sec] and a sampling rate of audio data is 44.1 [KHz], audio data, which has an amount of information for the number of output samples (1470 [sample]) of audio data equivalent to a display period for one frame of the video data, is set as one block. A frame of the video data is updated at timing when the block of the audio data is transferred to the buffer for audio reproduction of the audio reproducing unit 16. Consequently, it is possible to extremely synchronize a video and an audio.

By adopting the first to the third methods of generating a video reproduction synchronizing signal explained above, it is possible to generate timing for frame update for video data on the basis of reproduction processing for audio data. Thus, it is possible to extremely accurately synchronize audio data and video data. Moreover, it is made unnecessary to prepare and manage resources of a timer for timing generation for frame update for video data.

Incidentally, when a sampling rate of audio data and a frame rate of video data are expressed as ratios of whole numbers, it is possible to simply set the number of output samples, which is obtained by dividing the sampling rate of the audio data by the frame rate of the video data, as audio data equivalent to a display period for one frame of a video.

In the examples explained above, a frame rate of video data is 30 [frame/sec] and a sampling rate of audio data is 44.1 [KHz] (=44100 [Hz]). In this case, the sampling rate of the audio data and the frame rate of the video data are expressed as ratios of whole numbers. However, the sampling rate and the frame rate are not always expressed as ratios of whole numbers depending on values of the respective rates. In this case, if a video and an audio are reproduced for a long time, deviation of lip-sync described later may occur to cause a problem.

Therefore, it is necessary to also take into account the case in which a sampling rate of audio data and a frame rate of video data are not expressed as ratios of whole numbers.

A case in which a sampling rate of audio data and a frame rate of video data are not expressed as ratios of whole numbers will be hereinafter explained.

Figure 11:
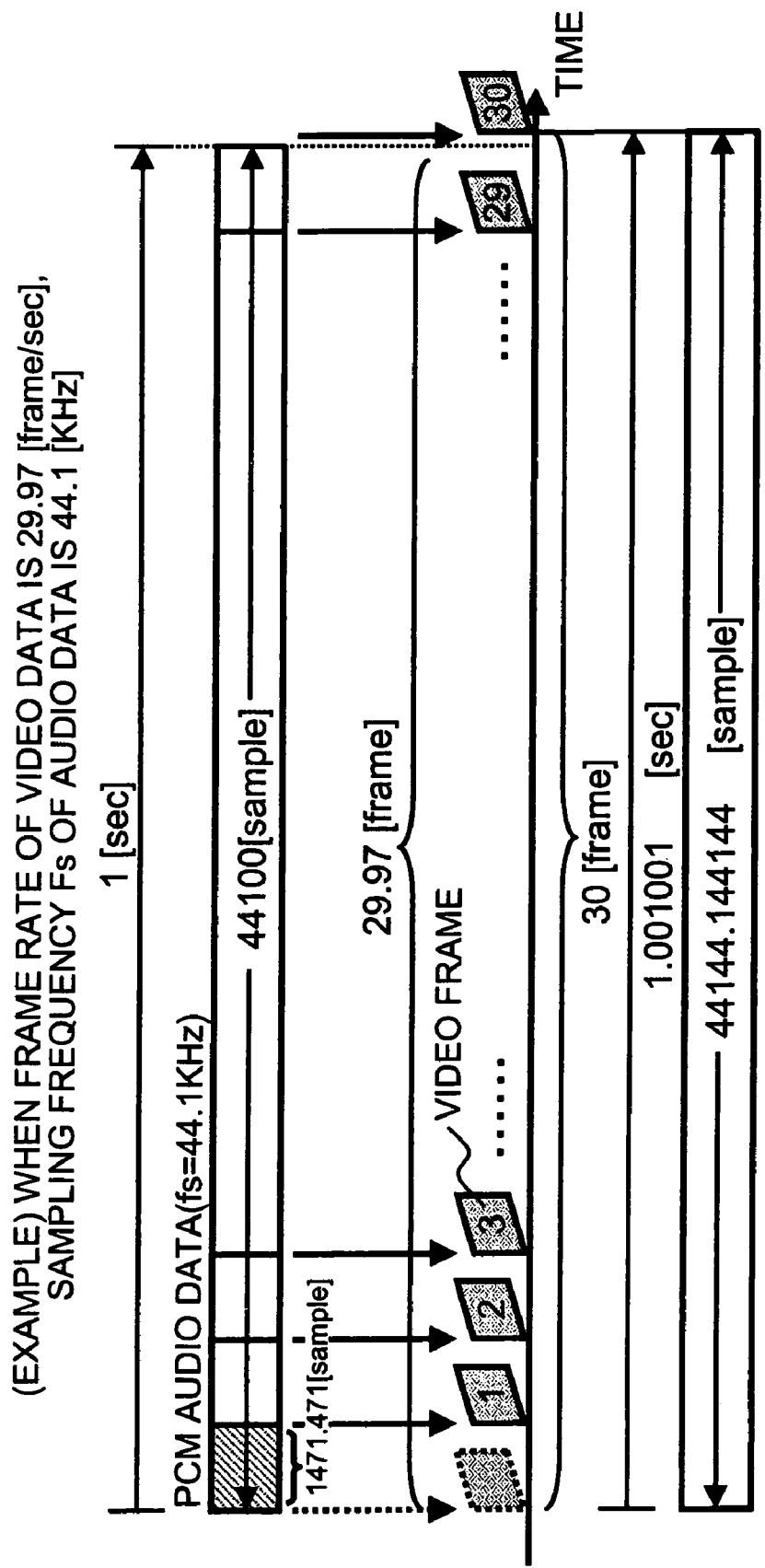
FIG. 11 is a schematic to explain a relation between audio data and video data at the time when a sampling rate of audio data and a frame rate of video data are not expressed as ratios of whole numbers of an exemplary embodiment.

FIG. 11 is a schematic to explain a relation between audio data and video data in the case in which a sampling rate of audio data and a frame rate of video data are not expressed as ratios of whole numbers. In an example of FIG. 11, it is assumed that a frame rate of video data is 29.97 [frame/sec] and a sampling rate of audio data is 44.1 [KHz]. In this case, as it is seen from FIG. 11, time during which thirty frames are outputted is calculated as about 1.001001 [sec]. The number of output samples of audio data in about 1.001001 seconds is 44144.14414 . . . . Since the sampling rate of the audio data and the frame rate of the video data are not expressed as ratios of whole numbers, such a numerical value is obtained.

The number of output samples of the audio data per one frame of the video data is 1471.471 . . . . However, the number of output samples of the audio data given to the D/A converter 161 of the audio reproducing unit 16 is naturally required to be a positive integer. Thus, the numerical value 1471.471 . . . calculated here, cannot be given to the D/A converter 161.

Thus, if the decimals are rounded up to a unit for 1471.471 . . . to obtain "1472" or the decimals are rounded down to obtain "1471" and a value fixed to "1472" or "1471" is used as the number of output samples in the methods described above to perform synchronous reproduction, a slight error of timing of the video data and the audio data gradually accumulates. When contents are reproduced for a long time, deviation of lip-sync increases to an unacceptable level.

In order to solve this problem, in this example, a method of switching is adopted to use the respective values of 1471 [sample] and 1472 [sample] appropriately such that, when averaged in a long span, the number of output samples of audio data equivalent to a display period for one frame of video data is about 1471.471 . . . [sample].

However, even in this case, the fluctuation of the number of output samples of respective audio data is as small as possible, that is, jitter of a frame update period is as small as possible. For example, even when update of a video frame is performed with extreme values such as "1", "2942", "1", "2942", "1", "2942", . . . , an average number of output samples is close to 1471.471 . . . . However, with the number, since jitter of a frame update period is too large, a sense of incongruity is given to a viewer. Moreover, it is less realizable in terms of hardware to switch a frame of a video at such timing.

Therefore, it is necessary to adopt a method of setting the number of output samples of audio data equivalent to a display period for one frame of video data such that a value of the number of output samples, when averaged in a long span, is an ideal number of output samples, and jitter of a frame update period is as small as possible.

As such a method of setting the number of output sample, two methods (a first method of setting the number of output samples and a second method of setting the number of output samples) are used.

The first method of setting the number of output samples is a method of setting the number of output samples according to Bresenham's algorithm. The second method of setting the number of output samples is a method of setting the number of output samples according to a Look Up Table (LUT).

First, a method of setting the number of output samples of audio data equivalent to a display period for one frame of video data will be explained using the first method of setting the number of output samples.

An ideal number of output samples $N_i$ [sample/frame] of audio data equivalent to a display period for one frame can be represented by the following expression.

$$N_i = f_s / F \qquad (1)$$
$$= \lfloor f_s / F \rfloor + (f_s \bmod F)/F$$
$$= \lfloor f_s / F \rfloor + (kf_s \bmod kF)/kF$$

In expression (1), fs is a sampling rate [sample/sec] of the audio data, F is a frame rate [frame/sec], and k is an integer coefficient for setting kF and kfs as integers.

Here, c is set as follows, $$c = (kfs \bmod kF)/kF \qquad (2)$$

and a value obtained by expression (2) is added to a variable b (an initial value 0) of a certain real number every time output processing of the audio data equivalent to the display period for one frame of the video is performed. As a result of the addition, only when an integer part of this variable b is "+1", the number of output samples N of audio data to be outputted next time is incremented by "+1".

Here, the frame rate F of the video data is set as F=29.97 [frame/sec] and the sampling rate fs of the audio data is set as fs=44.1 [KHz]. Thus, Ni=44100/29.97=1471.471471 . . . [frame/sec] is obtained. However, it is necessary to set the number of output samples N at the time of actual output to an integer relatively close to 1471.471471 . . . . In addition, c in expression (2) is calculated as c=0.471471.

FIG. 12 is a schematic of a result of calculating the number of output samples equivalent to respective frames using Bresenham's algorithm for each frame of an image. As it is seen from FIG. 12, the number of output samples of audio data equivalent to frame number n=1, 2, 3, . . . of a video frame is "1471" or "1472". In the case of this example, when an integer part of a value ($b_n$) obtained by adding 0.471471 to a variable b (an initial value 0) of a certain real number is "+1", the number of output samples N of audio data to be outputted next is incremented by "+1".

In the example of FIG. 12, the integer part of $b_n$ in the frame number 2 is 0 and the integer part of $b_n$ in the frame number 3 is 1. Thus, the number of output samples of audio data equivalent to the next time (the frame number 4) is also "1472" calculated as "1471+1". Similarly, in the example of FIG. 12, the number of output samples of audio data equivalent to the frame number 6, the frame number 8, and the frame number 10 is also "11472".

In this way, in the case of this example, as the number of output samples of audio data equivalent to respective frames of video data, "1471" or "1472" appears at a certain probability. Note that, although only the numbers of output samples for eleven frames are shown in FIG. 12, the same tendency is obtained in a long span.

Therefore, when averaged in a longer span, the numbers of output samples of audio data equivalent to respective frames of video data are very close to 1471.471471 . . . that is the ideal number of output samples. Moreover, in the case of this example, fluctuation of the number of output samples for each frame is "1", which is about 22.7 [μsec] in terms of time. Therefore, jitter of a frame update period is about 22.7 [μsec], which is not a factor giving a sense of incongruity to a viewer.

As explained above, it is possible to reduce the jitter of a frame update period to be extremely small by using the first method of setting the number of output samples.

Note that, in the example described above, the number of output samples of audio data is set for each frame. However, time for one sample of the audio data is as short as about 22.7 [μsec] (when a sampling rate is 44.1 [KHz]). Therefore, it is considered that, even if the number of output samples is not set for every frame of video data, a sufficient lip-sync quality is practically obtained. Thus, adjustment of the number of output samples by the first method of setting the number of output samples may be performed for every plural frames as long as a sufficient lip-sync quality is practically obtained and jitter of a frame update period of video data can be allowed.

Next, the second method of setting the number of output samples will be explained. This second method of setting the number of output samples is a method of setting the number of output samples according to a Look Up Table (LUT).

In general, values of a frame rate and a sampling rate are determined in advance in a form of some standard. For example, as the frame rate, there are 30 [frame/sec], 29.97 [frame/sec], 24 [frame/sec], 15 [frame/sec], 10 [frame/sec], and the like. As the sampling rate, there are 8 [KHz], 32 [KHz], 44.1 [KHz], 48 [KHz], and the like. In this way, frame rates and sampling rates, which are generally used, are discrete values.

Therefore, it is possible to obtain the same advantage as the first method of setting the number of output samples by determining rules such as the number of output samples of audio data and frequency of adjustment of the number of output samples (this frequency means that the number of output samples is adjusted every plural frames as described above) in advance according to combinations of frame rates and sampling rates (and the number of quantized bits and the number of channels), holding the rules as a table, and using the table.

FIG. 13 is a schematic of an example of a table that makes it possible to refer to rules that are determined in advance on the basis of a frame rate and a sampling rate. In FIG. 13, rules, which should be referred to, are described according to combinations of frame rates ad sampling rates in the following manner. For example, when a frame rate is 10 [frame/sec] (in FIG. 13, represented as [fps]) and a sampling rate is 8 [KHz], a 'rule "10-8"' is referred to. When a frame rate is 15 [frame/sec] and a sampling rate is 8 [KHz], a 'rule "15-8"' is referred to.

As an example, when a frame rate is 29.97 [frame/sec] and a sampling rate of 44.1 [KHz], a 'rule "29.97-44.1"', which should be referred to, is described in FIG. 13. The number of output samples is set on the basis of this rule.

As this 'rule "29.97-44.1"', it is possible to set various methods of setting the number of output samples. Here, three rules for setting the number of output samples will be explained as examples.

First, as a first rule for setting the number of output samples, the number of output samples for each frame is calculated in advance according to the algorithm of Bresenham and the number of output samples is used. Specific values are as shown in FIG. 12.

As a second rule for setting the number of output samples, 1471 [sample] and 1472 [sample] are repeated alternately for each frame. 1443 [sample] is set only once in 1000 frames. Compared with the first rule for setting the number of output samples, jitter of a video frame update period is slightly large. However, it is possible to realize the second rule for setting the number of output samples with a smaller amount of arithmetic operation.

As a third rule for setting the number of output samples, 1471 [sample] is repeated 500 times and, subsequently, 1472 [sample] is repeated 499 times. Subsequently, 1443 [sample] is set only once. This combination is repeated. This is a modification of the second rule for setting the number of output samples. As in the second rule for setting the number of output samples, compared with the first rule for setting the number of output samples, jitter of a sampling update period is slightly large. However, it is possible to realize the second rule for setting the number of output samples with a smaller amount of arithmetic operation.

The number of output samples obtained by the first method of setting the number of output samples or the second method of setting the number of output samples is applied to step S21 in FIG. 6, step S51 in FIG. 7, and step S81 in FIG. 8. This makes it possible to maintain highly accurate lip-sync for a long time even when a sampling rate of audio data and a frame rate of video data are not expressed as ratios of whole numbers.

In step S21 in FIG. 6, a predetermined value of the number of output samples of audio data is set as the number of output samples obtained by the first method of setting the number of output samples or the second method of setting the number of output samples. In step S51 in FIG. 7, a flag position of audio data is set as a position equivalent to the number of output samples obtained by the first method of setting the number of output samples or the second method of setting the number of output samples. In step S81 in FIG. 8, a block size of audio data blocks, which should be transferred, is set as a block size that is calculated from the number of output samples obtained by the first method of setting the number of output samples or the second method of setting the number of output samples. By performing such setting, it is possible to maintain highly accurate lip-sync for a long time even when a sampling rate of audio data and a frame rate of video data are not expressed as ratios of whole numbers.

Note that it is also possible to use the table in the second method of setting the number of output samples regardless of whether a sampling rate of audio data and a frame rate of video data are expressed as ratios of whole numbers.

Second Exemplary Embodiment

Figure 14:
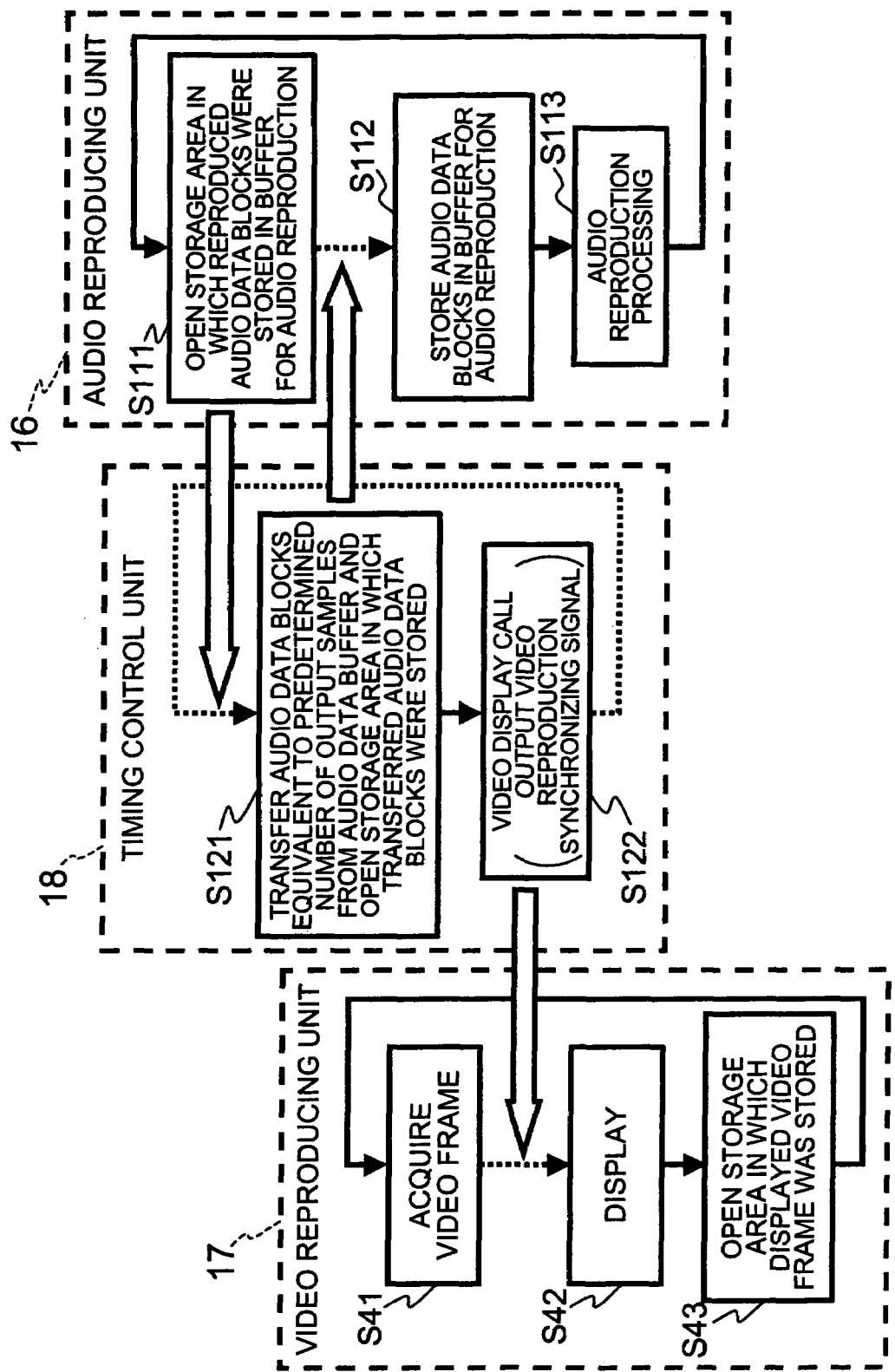
FIG. 14 is a schematic to explain an example of a method of generating a video reproduction synchronizing signal in an apparatus for synchronously reproducing a video and an audio according to a second exemplary embodiment.

FIG. 14 is a schematic to explain an example of a method of generating a video reproduction synchronizing signal in an apparatus for synchronously reproducing a video and an audio according to a second embodiment.

In the method of generating a video reproduction synchronizing signal according to the second embodiment, timing, at which audio data blocks equivalent to a predetermined number of output samples are transferred from the audio data buffer 14 to a buffer for audio reproduction processing provided on the audio reproducing unit 16 side, is set as output processing end timing for output to the audio reproducing unit 16 to perform frame update for video data at this output processing end timing. Note that the buffer for audio reproduction processing is equivalent to a buffer for audio reproduction 164 in FIG. 16 described later.

In order to realize the method of generating a video reproduction synchronizing signal according to the second embodiment, it is preferable to adopt a buffer structure in which two stages of buffers for audio data are provided. A two stage buffer structure, which includes the audio data buffer 14 (equivalent to the audio data buffer 14 in FIG. 2), in which audio data decoded by the audio decoder 12 is written, and a buffer for audio reproduction 164 provided on the audio reproducing unit 16 side, is adopted. Note that the buffer for audio reproduction 164 is not shown in FIG. 2. By adopting such a two stage buffer structure, it is possible to reproduce audio data without break.

Figure 16:
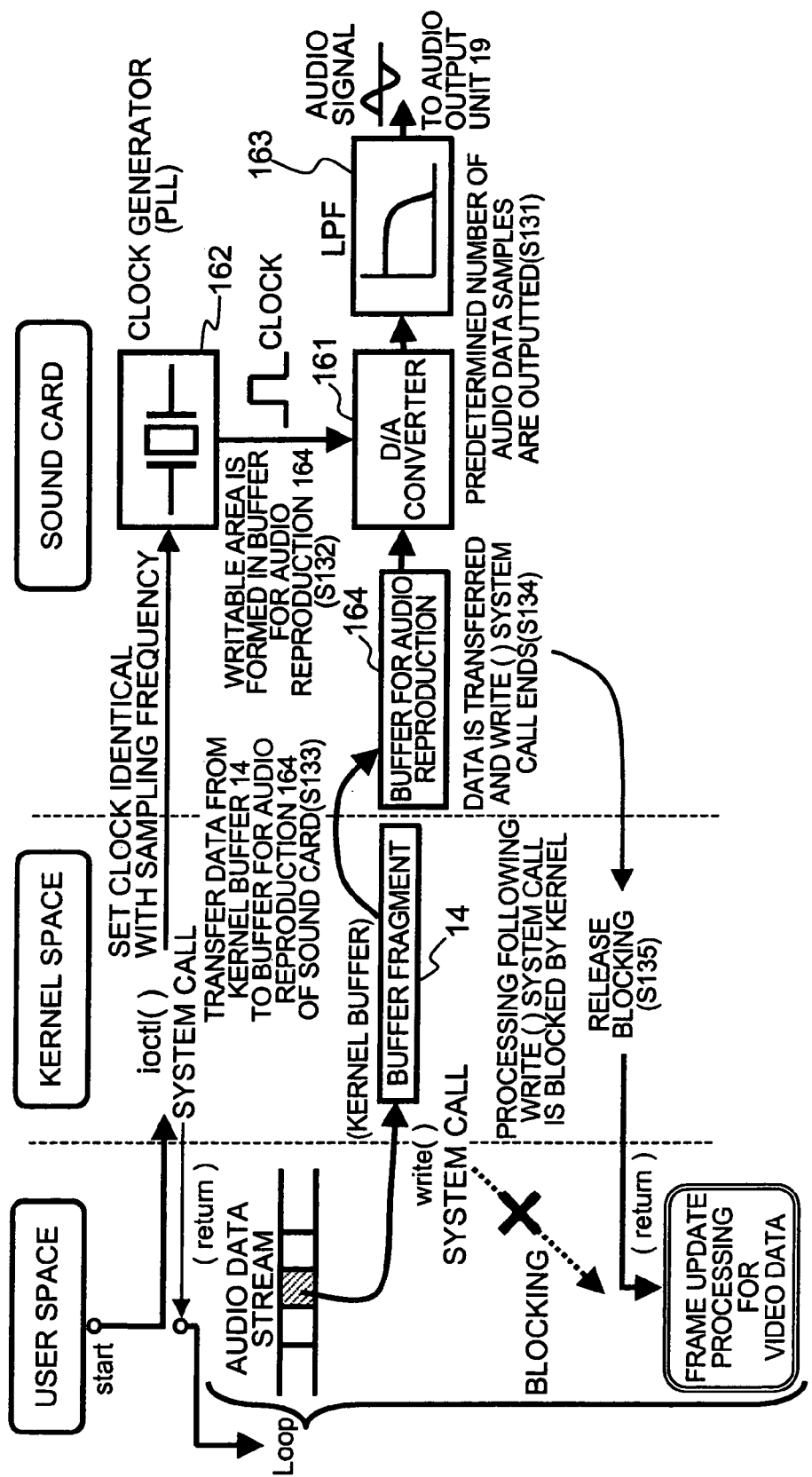
FIG. 16 is a schematic conceptually showing a case in which synchronous reproduction of a video and an audio processing in the apparatus to synchronously reproduce a video and an audio according to the second exemplary embodiment is performed using the non-preemptive multitask OS.
Figure 17:
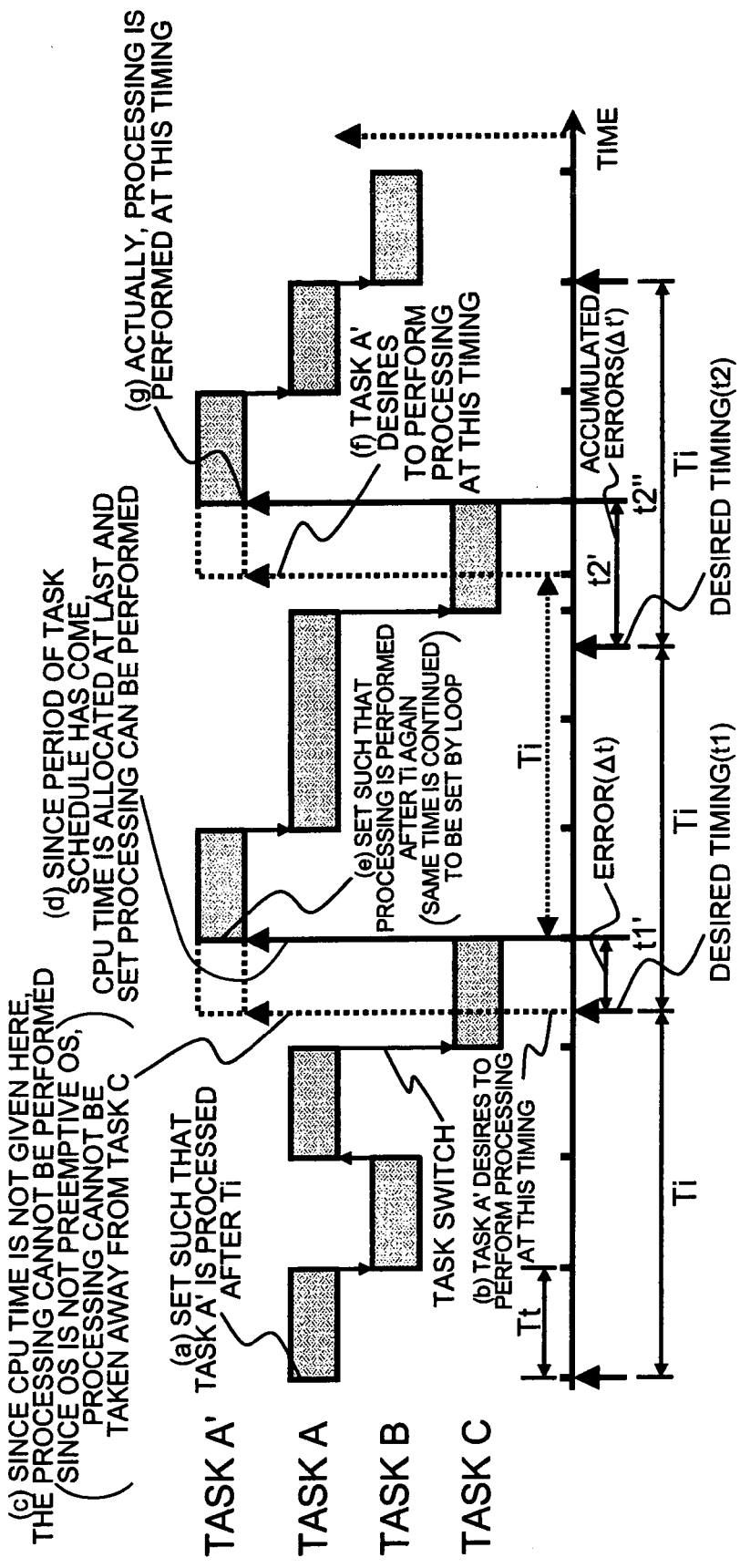
FIG. 17 is a schematic to explain task scheduling of the non-preemptive multitask OS.

Note that, as shown in FIG. 16 described later, the buffer for audio reproduction 164 is provided at a pre-stage of the D/A converter 161. It is possible to provide a new dedicated buffer in the audio reproducing unit 16 to use the buffer as the buffer for audio reproduction 164. However, if the audio reproducing unit 16 originally has storing means usable as the buffer for audio reproduction, it is also possible to use the storing means.

Control for transfer of audio data blocks written in the audio data buffer 14 to the buffer for audio reproduction 164 is performed according to a transfer instruction from the timing control unit 18.

Referring back to FIG. 14, first, the audio reproducing unit 16 opens a storage area (a storage area in which reproduced audio data blocks were stored) of the buffer for audio reproduction 164 (step S111). This opening of the storage area is performed at timing when audio data blocks written in the buffer for audio reproduction 164 are outputted to the D/A converter 161.

The timing control unit 18 transfers audio data blocks of a predetermined number of output samples (the number of output samples equivalent to a display period for one frame of video data) from the audio data buffer 14 to the buffer for audio reproduction 164 of the audio reproducing unit 16 and opens storage areas in which the transferred audio data blocks were stored (step S121). Then, the timing control unit 18 sets this timing for transfer of the audio data blocks to the audio reproducing unit 16 as output processing end timing for audio data blocks equivalent to the display period for one frame of the video data. The timing control unit 18 generates a video reproduction synchronizing signal at every output processing end timing, applies video display call (outputs the video reproduction synchronizing signal) to the video reproducing unit 17 (step S122), and returns to step S121.

The audio reproducing unit 16 acquires the audio data blocks transferred from the audio data buffer 14 and stores the audio data blocks in the buffer for audio reproduction 164 and performs audio reproduction (step S113) and returns to step S111.

When the video reproducing unit 17 receives the video display call (the video reproduction synchronizing signal) from the timing control unit 18, as in the case of FIG. 6, the video reproducing unit 17 displays the video frame acquired in step S41 and, then, opens a storage area of the video frame buffer 15 (see FIG. 5) in which the displayed image frame was stored (steps S42 and S43).

As explained above, in the method of generating a video reproduction synchronizing signal according to the second exemplary embodiment, a video reproduction synchronizing signal is outputted at timing when audio data blocks equivalent to a display period for one frame of video data are transferred from the audio data buffer 14 to the buffer for audio reproduction 164 of the audio reproducing unit 16 and frame update for video data is performed according to this video reproduction synchronizing signal.

Specifically, for example, when a frame rate of video data is 30 [frame/sec] and a sampling rate of audio data is 44.1 [KHz], the number of output samples (1470 [sample]) of audio data equivalent to one frame of the video data, is set as one audio data block. A frame of the video data is updated at timing when the audio block is transferred to the buffer for audio reproduction 164 of the audio reproducing unit 16. Consequently, it is possible to reproduce a video and an audio in synchronization with each other highly accurately.

As explained above, by adopting the method of generating a video reproduction synchronizing signal according to the second embodiment, it is possible to generate timing for frame update for video data on the basis of reproduction processing for audio data. Thus, it is possible to synchronize audio data and video data highly accurately. Moreover, it is made unnecessary to prepare and manage resources of a timer for timing generation for frame update for video data.

A method of synchronously reproducing a video and an audio according to the second embodiment makes it possible to perform synchronous reproduction of a video and an audio shown in FIG. 14 using the non-preemptive multitask OS. In the method of synchronously reproducing a video and an audio according to the second embodiment, output processing end timing for output to the audio reproducing unit 16 for audio data blocks equivalent to a display period for one frame of video data is acquired using the non-preemptive multitask OS at more precise timing than a period of task scheduling of the multitask OS.

FIG. 15 is a schematic to explain a method of using the non-preemptive multitask OS to obtain a precise task scheduling period making use of an audio output.

In FIG. 15, there are plural tasks A, B, and C. The task A is a task capable of generating and outputting a video reproduction synchronizing signal for processing for writing audio data blocks equivalent to one frame of video data from the audio data buffer 14 on the kernel side to the buffer for audio reproduction 16 on the audio reproducing unit 16 side (transfer processing) and frame update processing for the video data.

The task A issues a system call of "write ( )" for transferring audio data blocks written in the audio data buffer 14 on the kernel side to the buffer for audio reproduction 164 on the audio reproducing unit 16 side at certain timing t1 within time allocated to the task A itself. When the multitask OS receives this system call of "write ( )", the kernel operates to transfer the audio data blocks from the audio data buffer 14 on the kernel side to the buffer for audio reproduction 164 on the audio reproducing unit 16 side in a period of "write ( )"

(indicated by an arrow in FIG. 15). During this period, since the kernel operates in a blocking mode of the multitask OS, the task A waits until "write ( )" ends, that is, until the kernel recovers from the blocking state.

When the kernel ends the transfer processing for the audio data blocks, the kernel recovers from the blocking state at timing t2 of the end of the transfer processing. Simultaneously with recovering from blocking, the task A performs "frame update processing ( )".

Note that timing of end of the system call of "write ( )" and timing for output of a video synchronizing reproduction signal for frame update coincide with each other. As explained in FIG. 14, in the second embodiment, timing, at which audio data blocks equivalent to a display period for one frame of video data are transferred to the buffer for audio reproduction 164 of the audio reproducing unit 16, is set as output timing for a video reproduction synchronizing signal.

Incidentally, if the kernel is processing the system call of "write ( )" given to the multitask OS from the task A in the blocking mode, since the system call is being processed in the kernel space, the task A never switches to other tasks (in the example of FIG. 15, the task B and the task C) until the processing of "write ( )" ends.

In this way, it is possible to set timing at which the system call of "write ( )" ends as desired timing by using the blocking mode of the multitask OS. Consequently, it is possible to use the non-preemptive multitask OS to acquire more precise timing than a task scheduling period of the OS and use the acquired timing as timing for performing frame update processing for video data.

FIG. 16 is a schematic conceptually showing a case in which an apparatus for synchronously reproducing a video and an audio according to the second embodiment is caused to perform processing using the non-preemptive multitask OS. It is assumed that a PC (personal computer) includes an audio card serving as an audio reproducing unit and a graphic card serving as a video reproducing unit. It is needless to mention that, if functions incorporated in a chip set can be used, the functions may be used. A UNIX (registered trademark) OS such as Linux (registered trademark) is operating on this hardware. Various decoders and a demultiplexer are implemented on the OS as software on a user space. The audio data buffer 14 is formed on a RAM and the video frame buffer 15 is formed on the RAM or a VRAM of a graphic card. Note that details of operations of respective units such as the audio decoder, the video decoder, and the demultiplexer are not specifically explained here. However, it is assumed that the units are operating asynchronously such that the audio data buffer and the video frame buffer never overrun or under-run at the time of reproduction.

When reproduction of a video and an audio is started in a user space, first, in order to set a sampling rate of audio data obtained from system data as a clock of the sound card, "ioctl ( )", which is a system call for controlling functions of respective devices, is issued.

In the kernel space, according to the system call, a clock identical with a sampling rate of audio data of the clock generator 162 of the sound card (the audio reproducing unit 16) is set via a device driver. Consequently, on the sound card (the audio reproducing unit 16) side, it is possible to subject audio data blocks (audio data equivalent to a display period for one frame of video data) written in the buffer for audio reproduction 164 D/A conversion in the D/A converter 161 and, then, output the audio data blocks as an audio signal through the low-pass filter 163.

On the user space, a system call of "write ( )" is issued to output decoded audio data blocks (audio data equivalent to a display period for one frame of a video) to the sound card side. However, on the kernel side where the system call is processed, data is temporarily written in the audio data buffer 14 on the kernel side (a storage area that the kernel uses for I/O with the various devices; hereinafter referred to as kernel buffer 14). Data is not outputted to the sound card side unless the kernel buffer 14 is filled. Thus, it is preferable to perform setting appropriately, for example, reduce a size of the kernel buffer 14 in advance according to a size of a data block. Consequently, the kernel outputs a data block given to the kernel to the sound card side every time the system call of "write ( )" is issued.

Note that the writing (transfer) of data from the kernel buffer 14 to the buffer for audio reproduction 164 cannot be performed unless there is a free space in the buffer for audio reproduction 164. By causing the system call of "write ( )" to operate in a blocking mode, a process in the user space comes into the blocking state and processing following the system call of "write ( )" is blocked by the kernel.

In the audio reproducing unit 16, when the audio data blocks written in the buffer for audio reproduction 164 is outputted to the D/A converter 161, a free space for one audio data block (audio data equivalent to a display period for one frame of video data) is formed in the buffer for audio reproduction 164. When the free space for the audio data blocks equivalent to a display period for one frame of video data is formed in the buffer for audio reproduction 164, it is possible to transfer the audio data blocks written in the kernel buffer 14 to the buffer for audio reproduction 164.

After the processing following the system call of "write ( )" is blocked by the kernel, when the audio data blocks already written in the buffer for audio reproduction 164 are outputted to the D/A converter 161, that is, when a predetermined number of audio data samples are outputted to the D/A converter 161 (step S131), a writable area for audio data blocks equivalent to a display period for one frame of video data is formed in the buffer for audio reproduction 164 (step S132).

When a free space for audio data blocks equivalent to a display period for one frame of video data is formed in the buffer for audio reproduction 164, the audio data bocks written in the kernel buffer 14 are transferred to the buffer for audio reproduction 164 (step S133). When the transfer of the audio data blocks ends, the system call of "write ( )" ends (step S134).

In this way, when the audio data blocks are transferred from the kernel buffer 14 to the buffer for audio reproduction 164, the system call of "write ( )" ends. Thus, at that point, blocking by the kernel is released (step S135) and the processing shifts to frame update processing for video data in the next step (the video data changes to a video reproduction synchronizing signal). Frame update is actually performed by performing buffer flip and bit block transfer at this timing.

By repeating such operations, it is possible to output a video reproduction synchronizing signal to the video reproducing unit 17 every time blocks of audio data equivalent to a display period for one frame of video data are outputted to the D/A converter 161. In other words, with this method, it is possible to use the non-preemptive multitask OS to acquire more precise timing than a task scheduling period of the multitask OS making use of the operation of the kernel at the time when the system call is issued in the blocking mode. It is possible to use the timing as timing for outputting a video synchronizing reproduction signal for performing frame update for video data.

Note that, when a sampling rate of audio data and a frame rate of video data are not expressed as ratios of whole numbers, in the method of synchronously reproducing a video and an audio according to the second embodiment, it is possible to cope with the same method as the case of the method of synchronously reproducing a video and an audio according to the first embodiment.

The method of generating a video reproduction synchronizing signal and the method of synchronously reproducing a video and an audio of the exemplary embodiments have been explained on the basis of the respective embodiments. However, the exemplary embodiments are not limited to the respective embodiments discussed above. Various modifications are possible in a range not departing from the spirit of the invention.

The exemplary embodiments are not limited to the method of generating a video reproduction synchronizing signal and the method of synchronously reproducing a video and an audio according to the first exemplary embodiment and includes the timing control apparatus and the apparatus for synchronously reproducing a video and an audio that are used in implementing the method of generating a video reproduction synchronizing signal and the method of synchronously reproducing a video and an audio. The exemplary embodiments also include the program for generating a video reproduction synchronizing signal having a procedure to cause the timing control apparatus to execute the method of generating a video reproduction synchronizing signal and a program for synchronously reproducing a video and an audio having a procedure to cause the apparatus to synchronously reproduce a video and an audio to execute the method of synchronously reproducing a video and an audio. In this case, the program for generating a video reproduction synchronizing signal and the program to synchronously reproduce a video and an audio may be recorded in a recording medium such as a flexible disk, an optical disk, or a hard disk. Therefore, the exemplary embodiments also include a recording medium having recorded these programs therein. The exemplary embodiments also include a program that can be supplied via a network.

What is claimed is:

1. A method of generating a video reproduction synchronizing signal to generate a video reproduction synchronizing signal to reproduce video data and audio data in synchronization with each other, the method comprising:
    acquiring output processing end timing for output to an audio reproducing unit for one-frame equivalent audio data that is equivalent to a display period for one frame of video data;
    generating the video reproduction synchronizing signal every time the output processing end timing is acquired; and
    setting the number of output samples of one-frame equivalent audio data for each frame of video data, the setting including determining the number of output samples by referring to a table describing rules to determine the number of output samples on the basis of a sampling rate of audio data and a frame rate of video data;
    the acquiring including executing acquiring for each frame of video data on the basis of the number of output samples set by the setting.

2. The method of generating a video reproduction synchronizing signal according to claim 1, the acquiring including acquiring timing, at which a count value of the number of output samples of audio data outputted to the audio reproducing unit is a predetermined value, as the output processing end timing.

3. The method of generating a video reproduction synchronizing signal according to claim 1, the acquiring including acquiring timing, at which a flag set in a predetermined position of audio data outputted to the audio reproducing unit is detected, as the output processing end timing.

4. The method of generating a video reproduction synchronizing signal according to claim 1, the acquiring including acquiring timing, at which a block of the one-frame equivalent audio data is transferred to the audio reproducing unit, as the output processing end timing.

5. The method of generating a video reproduction synchronizing signal according to claim 1, further including generating the video reproduction synchronizing signal using a non-preemptive multitask operating system.

6. The method of generating a video reproduction synchronizing signal according to claim 5, the acquiring including acquiring timing, at which a blocking mode set on the basis of a system call issued at the time when the one-frame equivalent audio data is transferred to the audio reproducing unit as a block is canceled according to end of the transfer of the block of the one-frame equivalent audio data, as the output processing end timing.

7. The method of generating a video reproduction synchronizing signal according to claim 1, the setting including determining the number of output samples such that an average value of the number of output samples is equal to or approximate to a predetermined value.

8. The method of generating a video reproduction synchronizing signal according to claim 7, the determining including using Bresenham's algorithm.

\* \* \* \* \*